United States Patent [19]

Childs et al.

[11] Patent Number: 6,017,200
[45] Date of Patent: Jan. 25, 2000

[54] INTEGRATED PUMPING AND/OR ENERGY RECOVERY SYSTEM

[75] Inventors: Willard D. Childs, Encinitas; Ali Dabiri, San Diego, both of Calif.

[73] Assignee: Science Applications International Corporation, San Diego, Calif.

[21] Appl. No.: 08/909,912

[22] Filed: Aug. 12, 1997

[51] Int. Cl.$^7$ .................................................. F04B 17/00
[52] U.S. Cl. .......................................... 417/404; 417/390
[58] Field of Search .................................... 417/404, 403, 417/401, 26, 53, 213, 390; 137/485

[56] References Cited

U.S. PATENT DOCUMENTS

| | | | |
|---|---|---|---|
| Re. 32,144 | 5/1986 | Keefer | 210/637 |
| Re. 33,135 | 12/1989 | Wanner et al. | 417/377 |
| 3,825,122 | 7/1974 | Taylor | 210/134 |
| 4,124,488 | 11/1978 | Wilson | 210/134 |
| 4,145,884 | 3/1979 | Childs | 60/486 |
| 4,403,919 | 9/1983 | Stanton et al. | 417/53 |
| 4,410,429 | 10/1983 | Harvey et al. | 210/416.1 |
| 4,432,876 | 2/1984 | Keefer | 210/652 |
| 4,434,056 | 2/1984 | Keefer | 210/637 |
| 4,637,783 | 1/1987 | Andeen | 417/318 |
| 4,756,830 | 7/1988 | Fredkin | 210/321.66 |
| 4,830,583 | 5/1989 | Edson | 417/318 |
| 4,836,924 | 6/1989 | Solomon | 210/321.87 |
| 4,902,207 | 2/1990 | Hembree et al. | 417/403 |
| 5,056,036 | 10/1991 | Van Bork | 364/510 |
| 5,154,820 | 10/1992 | Solomon | 210/134 |
| 5,244,361 | 9/1993 | Solomon | 417/403 |
| 5,306,428 | 4/1994 | Tonner | 210/652 |
| 5,462,414 | 10/1995 | Permar | 417/313 |

OTHER PUBLICATIONS

Childs, et al., "Increased Water Production Using a Heat Recovery Engine for "Direct Drive" VARI–RO™ Pumping", *Elsevier Science B.V. Amsterdam*, Desalination, 96 (1994).

Sims, "New Desalination Cuts Costs Sharply",*The New York Times*, (May 1987).

Childs, et al., "Desalination Cost Savings of VARI–RO™ Pumping Technology", *Elsevier Science B.V. Amsterdam*, Desalination, 87 (1992).

Childs, et al., "Desalination",*Elsevier Science B.V.*, Desalination, 103 (1995).

*Primary Examiner*—Timothy S. Thorpe
*Assistant Examiner*—David J. Torrente
*Attorney, Agent, or Firm*—Fitch, Even, Tabin & Flannery

[57] ABSTRACT

An energy-recovery pump or pumping system includes, in a double action embodiment, first and second cylinders wherein respective first and second pistons, mounted to a common reciprocating piston shaft, are mounted for reciprocating motion. A hydraulic pump drives the common piston shaft back and forth in accordance with a prescribed velocity profile that includes acceleration, constant velocity, and deceleration periods, as well as a short dwell time at the conclusion of each stroke during which the shaft and pistons remain stopped. Each piston divides each cylinder into first and second working volumes. Input and output valves connect a source of fluid with an output header through half of the working volumes in such a way that the fluid is received within whichever working volume is expanding and is pumped from whichever working volume is contracting, as the pistons move back and forth within their respective cylinders during a pump cycle. Energy recovery valves selectively connect a second fluid under pressure with whichever of the other half of the working volumes is expanding so that the pressure force associated with the second fluid assists in moving the respective piston during the appropriate portion of the pump cycle. The second fluid is discharged from the respective working volumes through discharge valves as such working volumes contract during the pump cycle. The energy recovery and discharge valves are switched from one position to another only when the pistons are stopped for the short dwell time at the end of a forward or backward stroke.

29 Claims, 6 Drawing Sheets

$$WV = \frac{L\pi}{4}[(d_2)^2 - (d_1)^2]$$

$$WV = \frac{L\pi}{4}[(d_2)^2 - (d_3)^2]$$

INTEGRATED PUMPING AND/OR ENERGY RECOVERY SYSTEM

BACKGROUND OF THE INVENTION

The present invention relates to an integrated pumping and/or energy recovery system. Typically, such systems are used to pump an input stream of fluid to be purified through a membrane or filter, such as a reverse osmosis membrane, at a high pressure. A stream of brine or other unpurified material is then discharged under pressure from such membrane or filter. In a preferred application, the present invention recovers energy from the discharge stream while it is still under pressure, and then uses such recovered energy for a useful purpose, e.g., to reduce the amount of energy that the pump would otherwise have to expend in order to pump the input stream of fluid into the system, thereby making operation of the purification system more efficient. An example of a system with which the present invention may be used is a reverse osmosis (RO) system.

As is known in the art, when a semi-permeable membrane divides two fluids of different salinities, osmosis occurs. To achieve equilibrium of the chemical potential across the membrane, liquid flows through the membrane into the more concentrated solution. This flow continues until concentrations on either side of the membrane are equal, unless the osmotic pressure is reached. The osmotic pressure, when reached, functions as a static head (due to the rising level on one side of the membrane) resulting in zero flow through the membrane.

A pressure that is applied in addition to the osmotic pressure causes the osmosis to reverse. With the flow reversed, liquid (referred to as permeate) flows from the more concentrated side of the membrane. Thus, practical systems may be designed with an operating pressure above the osmotic pressure in order to force a reverse osmotic fluid flow from the more concentrated side of the membrane to a desalted permeate. In this manner, desalted permeate may be produced from a saline feed stream. That is, reverse osmosis desalination systems may be designed that desalt brackish or seawater.

The osmotic pressure is a colligative property of the fluids being processed and is dependent on the concentrations of salts and minerals in the fluid. For seawater, the osmotic pressure is approximately 25 kg/cm$^2$, or approximately 355 pounds per square inch (psi). Presently commercial membranes operate at approximately 55–82 kg/cm$^2$ (approximately 800–1200 psi). Of course, limits exist on the permissible concentration of salts within the membranes. Supersaturation of salts may result in deposition of salts on the membrane, and increased concentrations have higher osmotic pressures. Commercial designs typically provide a permeate flow of 30–55% of the input feed liquid (the seawater), which permeate flow is commonly referred to as the Recovery Rate or Recovery Ratio of the reverse osmosis system.

It is known in the art to improve the efficiency of the reverse osmosis process by recovering energy from the high pressure waste brine. Known methods of pumping and of energy recovery include, for example, some combination of: plunger pumps with belt drives and pulsation dampeners, centrifugal pumps, sumps and sump pumps, reverse flow pump and Pelton wheel energy recovery turbines, hydraulic turbo chargers, flow work exchangers, and variable frequency drives.

The present invention accomplishes the same functions achieved by the above-listed prior art pumping and energy recovery methods in a unique way. The energy recovery function of the present invention most closely resembles an energy recovery system of the work exchanger type. Numerous types of work exchanger energy recovery systems have been proposed for use with reverse osmosis or similar systems. See, e.g., U.S. Pat. Nos. 3,558,242; 3,791,768; 3,825,122; 4,124,488; Re 32,144; 4,410,429; 4,432,876; 4,434,056; Re 33,135; 4,637,783; 4,756,830; 4,830,583; 4,836,924; 5,306,428 and 5,500,113.

Of these prior art energy recovery systems, two are of particular interest relative to the invention disclosed herein. A first type, which will be referred to hereafter as a flow work exchanger (FWE) system, is illustrated, e.g., in U.S. Pat. No. 5,306,428. In a FWE system, energy is recovered from waste brine streams through the use of sliding pistons which pressurize the feed stream, thereby reducing the amount of energy that the main pump must expend in order to raise the feed stream to the desired pressure for reverse osmosis operation. Such systems typically operate at a very slow piston cycle rate, require valve switching at full flow, and thus cause enormous pressure pulsations to occur, all of which contribute to significant maintenance costs and a relatively short component lifetime.

A second work exchanger type of energy recovery system of interest to the present invention will be referred to hereafter as a "bang bang" system. In general, a "bang bang" system employs pistons of different areas with connecting rods. An example of a bang bang system is shown in U.S. Pat. No. 3,825,122. In a "bang bang" system, energy is recovered from waste brine streams through the use of an energy recovery piston that is mechanically linked with the main reciprocating piston of the pump. Thus, as the pump piston moves in a forward stroke direction, pressure is applied through the energy recovery piston, which is connected through appropriate valves with the waste brine stream, to aid in pushing the pump piston along in its forward direction. When the piston reaches the end of its forward direction, it bangs into the end of its stroke (hence, the term "bang bang") and prepares for movement in the other direction. When the pump piston changes direction, the setting of the energy recovery valves must be altered so that the added force supplied through the energy recovery piston is applied in the reverse direction. Unfortunately, as with the FWE system, the valves must be switched at full or near-full flow, thereby creating significant pressure fluctuations in the system. Moreover, the pressure differential across the pump energy recovery piston, as well as the main pump piston, remains high at all times, equal to or near the full pressure of the system, thereby magnifying maintenance problems associated with sealing such pistons, and compromising the life of the pump components.

It is thus apparent that what is needed is an integrated pumping and energy recovery system that accomplishes the functions provided by the previously-mentioned devices and methods, yet overcomes the shortcomings of the FWE and bang-bang type systems. The present invention addresses these and other needs.

SUMMARY OF THE INVENTION

The present invention is directed to an integrated energy-recovery pump or pumping system. Such pump, or pumping system, is particularly well suited for use in a reverse osmosis (RO) or similar desalting application. However, it is to be emphasized that the invention is not limited to reverse osmosis or similar applications. Rather, the invention may find applicability in any type of application where a fluid stream under pressure exists from which energy may be recovered for useful purposes, such as achieving high pressure pumping.

In accordance with one aspect of the invention, an integrated feed water pumping and concentrate energy recovery system is provided for use with RO desalting applications. The system utilizes modern hydraulic power transmission and control techniques to provide a highly efficient, low cycle speed, low pulsation, variable flow, positive displacement, pumping and energy recovery system for use within a low, medium, or high capacity RO desalting facility. Such technology replaces the bulky cranks, gearing and housing normally associated with positive displacement, reciprocating pumps, and the variable speed drives normally associated with centrifugal pumps.

In accordance with another aspect of the invention, an integrated feed water pumping and concentrate energy recovery system is provided that uses hydraulic power transmission which offers variable flow capability at high power density. Advantageously, the use of hydraulic power allows the energy conversion process to be optimized in a way not usually feasible with conventional mechanical power transmission techniques. Other technology features associated with the invention include: variable flow, smooth flow with very low pressure pulsation, and low cycle speeds. The smooth output flow feature advantageously allows the efficient, positive displacement technology of the invention to be utilized for high capacity applications, presently serviced by, e.g., combinations of centrifugal pumps, reverse flow pump turbines, Pelton wheel turbines, and variable frequency drives. The present invention thus represents a viable candidate for replacement of these and equivalent high capacity devices.

The preferred integrated pump and energy recovery system of the present invention is made up of three main subsystems: (1) a hydraulic power supply (HPS), (2) a water displacement unit (WDU), and (3) an electronic control unit (ECU).

The HPS comprises a variable stroke pump, having a reciprocating drive output. The HPS, and associated control unit, form the basic building block for an integrated pumping and energy recovery system for either seawater or brackish water. The HPS includes an electric motor, hydraulic pumps, control valves, and auxiliary equipment. The auxiliary equipment includes a reservoir, liquid level switch, filters, base structure, and vibration isolation equipment, as is known in the art.

The WDU functions as a pump that pumps the water to the RO membrane bank and recovers energy from the rejected brine. The WDU comprises the heart of the present invention. It includes one or more water cylinders, water direction (pressure) valves, hydraulic cylinders, and auxiliary equipment. The auxiliary equipment includes valve piping manifolds, headers, and support structure, as is known in the art.

The ECU controls the HPS and the WDU to obtain the desired function during the pumping and energy recovery operation.

The water cylinder (WC) forms the basic element of the WDU. In a preferred double-action embodiment, the WC includes first and second sealed cylinders wherein respective first and second pistons, mounted to a common reciprocating piston shaft, are driven by the HPS or other power source. The power source drives the common piston shaft back and forth, thereby forcing the first and second pistons to slide in unison back and forth within the respective first and second cylinders, in accordance with a prescribed velocity profile. Such velocity profile includes acceleration, constant velocity, and deceleration periods, as well as a short dwell time at the conclusion of each forward or backward stroke during which the shaft and pistons remain stopped. The use of such velocity profile advantageously avoids the "bang bang" problems associated with prior art systems.

In the preferred double-action embodiment, each piston within the WC divides its respective cylinder into first and second working volumes, with the first working volume comprising that volume which diminishes during a forward stroke of the piston, and the second working volume comprising that volume which diminishes during a backward stroke of the piston. Input and output valves connect a source of fluid with an output header through the first working volume within the first cylinder or the second working volume within the second cylinder. These input and output valves cooperate so as to receive fluid from the input fluid source within whichever working volume is expanding, and to pump the fluid from whichever working volume is diminishing or contracting, as the pistons are worked back and forth within their respective cylinders during a pump cycle.

An output header of the WC or pump may be connected to, e.g., a reverse osmosis membrane or membrane bank. Energy recovery valves, which form an integral part of the WDU, selectively connect a stream of pressurized fluid, such as is obtained from the discharge header of the reverse osmosis membrane, with the second working volume of the first cylinder, or the first working volume of the first cylinder, so that the pressure force associated with such fluid-pressurized stream assists in moving the respective piston as the working volume expands during the appropriate portion of the pump cycle. Advantageously, this action reduces the overall energy that would otherwise have to be provided by the power source in order to reciprocate the piston shaft through a pump cycle and raise the pressure of the input fluid up to the pressure needed by the RO membrane. The energy recovery valves also operate to discharge fluid from the second working volume of the first cylinder, or from the first working volume of the second cylinder, as such working volume contracts during the next stroke of the piston shaft in the opposite direction.

The WC may also be implemented in a single action embodiment. The single-action embodiment is similar to the double-action embodiment described above except that there is only one cylinder having one piston therein. The piston divides the cylinder into first and second working volumes as described above. An energy recovery valve connects the stream of pressurized fluid to the second working volume as the piston moves in a direction that causes the second working volume to expand, thereby adding to the force with which the piston moves in that one direction. During the other stroke direction, no energy recovery takes place, but rather the brine is expelled from the second working volume of the single cylinder. Thus, it is seen that in the single-action embodiment, energy is recovered during just one half of the pump cycle. Nevertheless, the simplicity of the single-action embodiment (which requires only one cylinder and accompanying valves), and the fact that at least some energy recovery occurs (even if only for 50% of the time), makes the single-action embodiment a viable alternative for many applications.

An important advantage provided by the invention relates to the manner in which the energy recovery valves are switched from one position to another during a given pump cycle. In order to reduce the wear and tear on such valves, and to thereby increase their life, they are switched from one position to another, e.g. from a position that connects the relevant working volume with the source of pressurized fluid or with a discharge header, only when the pistons are stopped for the short dwell time at the end of a forward or backward stroke.

Another important advantage provided by the invention relates to the pressure differential across the pistons. The present invention maintains such pressure differential at a minimal value. This is in contrast with prior art reciprocating pump pistons which usually place the full pressure differential across the piston(s).

Yet an additional advantage offered by the invention allows the working volume associated with the energy recovery valves to be readily adjusted to be equal but less than the working volume associated with the input and output valves, even though the piston stroke distance of both working volumes remains the same. This feature is particularly important when the pump is used as part of a reverse osmosis system wherein the source of pressurized fluid is derived from the discharge stream of the reverse osmosis membranes (and therefore represents a fixed percentage of the output fluid that is pumped by the system). A reverse osmosis system typically has a recovery ratio of 25 to 55% for seawater, and up to 90% for brackish water. Thus, by way of example, if the recovery ratio is 30%, that means 30% of the fluid is recovered from the system as purified fluid, and 70% is discharged as unpurified concentrate, i.e., brine. In such situation, the present invention advantageously allows the discharged brine stream to be used as the source of pressurized fluid coupled to the energy recovery valves, and allows the working volume associated with such concentrate to be readily set to be 70% of the working volume associated with the input/output valves, even though the stroke distance of the piston (for the single-action embodiment) or the pistons (for the double-action embodiment) associated with the relevant working volume remains the same.

In a preferred embodiment, a plurality of integrated pumps, or WDU's, of the type described above, e.g., three such pumps, are connected in parallel, with the piston stroke of each pump being phased appropriately compared to the piston stroke of the other pumps so as to minimize pressure surges. For example, when three such pumps are used, then the piston strokes are phased to be 120° apart.

It is thus a feature of the present invention to provide an integrated pumping system which through energy recovery means operates more efficiently than conventional pumps or pumping systems.

It is another feature of the invention to provide a pumping and energy recovery system which can either replace or be used in conjunction with conventional pumps.

It is an additional feature of the invention to provide an efficient energy-recovery pump that can operate at a relatively slow speed, e.g., with a pump cycle rate of only about 10–15 cycles per minute, even though the other operating parameters of the pump, e.g., flow rate and output pressure, remain competitive with other pumping systems. Such a relatively slow pump rate advantageously increases the life of the components used within the pump.

A related feature of the invention is to provide an efficient energy-recovery pump wherein the pressure differential across the piston(s) of the pump remains relatively low, thereby improving the operating life of the piston(s).

Another feature of the invention provides an efficient energy-recovery pump or pumping system that may be set up and operate within a relatively small area.

Yet another feature of the invention is to provide an efficient energy-recovery pump and/or pumping system that is ideally suited for use in a reverse osmosis water desalination or other purification system, thereby making the extraction of desalted water from seawater, for example, economically viable.

Still an additional feature of the invention is to recover energy from a fluid stream under pressure and to make such energy available for other useful purposes, for example, to help drive a reciprocating, positive-displacement pump.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
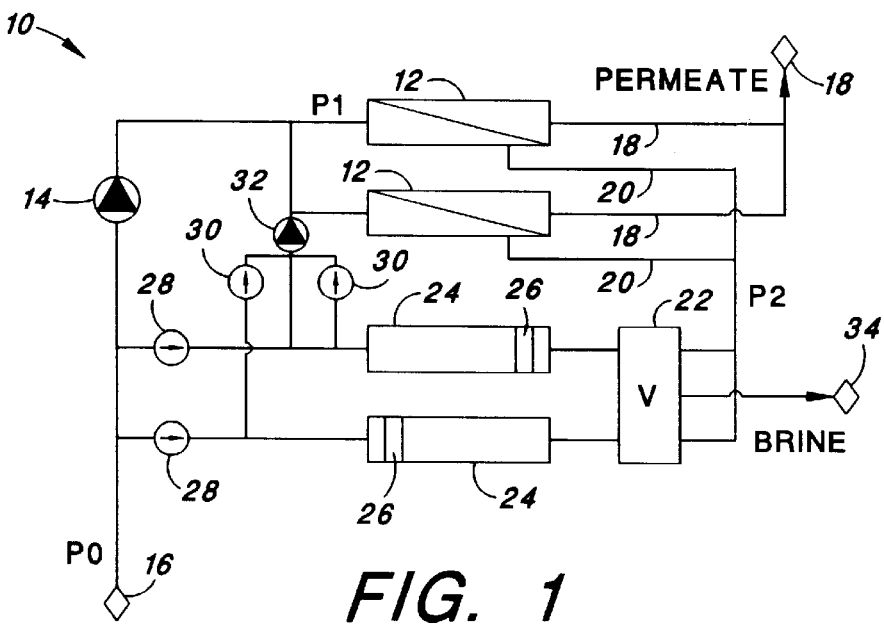
FIG. 1 is a block diagram of a prior art flow work exchanger (FWE) type of energy recovery pumping system.

In order to better appreciate the advantages and features of the present invention, it will first be helpful to briefly review what applicants believe is the closest known prior art for energy recovery systems. Reference is thus made to FIG. 1 where there is shown a block diagram of a prior art flow work exchanger (FWE) type of energy recovery pumping system 10. Two reverse osmosis (RO) membranes 12 receive an input stream at a high pressure P1 from a pump 14 in fluid communication with a source of seawater 16, or other fluid to be desalted. The source of seawater 16 is typically provided at a low pressure P0 through a supply pump (not shown). The pump 14 thus increases the pressure of the input fluid from a low pressure P0 to a high pressure P1. In a typical seawater RO system, P0 may be on the order of 30–50 psi, while P1 may be on the order of 800–1200 psi. It is the function of any energy recovery system to reduce the amount of power required to achieve this pressure change.

The RO membrane 12 includes two output lines. A first line 18 provides the permeate, or desalted water. A second line 20 provides a high pressure stream of brine or other concentrate at pressure P2, where P2 is less than P1 by a relatively small amount, e.g., 50–100 psi. The high pressure brine is directed through a suitable valve network 22 to two floating piston chambers 24. Each chamber 24 includes a sliding piston head 26 that is free to slide or move from one end of the chamber 24 to the other as a function of whichever side of the piston head is subjected to the highest pressure. As drawn in FIG. 1, the right side of the piston head 24 is selectively exposed to the high pressure brine stream as a function of the settings of the valve network 22. The left side of the piston head 24 is exposed to the low pressure input seawater 16, which is presumed to be at a modest pressure P0 by action of a supply pump (not shown), through pressure valves 28. Note, a pressure valve functions as a one-way device, allowing fluid to flow there through only in the direction indicated when sufficient pressure exists to support such flow. If a reverse pressure is applied to a pressure valve, then all flow through the valve in the reverse direction is blocked. Additional pressure valves 30 allow fluid flow from the left side of the piston heads 26 to an auxiliary pump 32, which pumps the fluid thus received to the input of the RO membranes 12 at a high pressure P1, thereby supplementing (and making more efficient) the pumping action provided by the main pump 14, which main pump 14 typically comprises a conventional centrifugal or plunger pump.

In operation, the pump 14 receives the input fluid 16 at pressure P0, pumps it to a high pressure P1, and applies it to the input of the RO membranes 12. The RO membranes allow some of the fluid, e.g., 25–55% of the fluid, to pass there through and exit as permeate, as a function of the Recovery Ratio of the membrane. The rest of the fluid exits the RO membrane 12 as a brine stream within the brine line 20. The brine stream is also at a high pressure P2, which pressure P2 is less than P1, but is still relatively high. For example, if P1 is on the order of 1000 psi, then P2 may be on the order of about 900 psi.

The valve network 22 connects the high pressure brine line 20 to only one of the chambers 24 at a time. The high pressure P2 of the brine stream forces the piston head 26 of the selected chamber to the left, blocking the respective pressure valve 28, and pressurizing the fluid thus trapped between the blocked pressure valve 28 and the moving-to-the-left piston head 26. Such pressurized fluid is forced through the pressure valve 30 to the auxiliary pump 32, where it is pumped to and supplements the high pressure P1 produced by the main pump 14. In this manner, much of energy associated with the high pressure brine stream is recovered and reapplied to the input stream of the RO membrane.

While the piston head 26 of one chamber 24 is moving to the left, the other piston head of the other chamber is moving to the right, as forced by the modest input pressure P0 of the input stream 16 provided by the supply pump (not shown). During this action, the valve network 22 connects the right side of the chamber 24 in which the piston head is moving to the right to a discharge port 34. This action thus empties the brine from the chamber 24 through the discharge port 34, thereby readying the chamber 24 to receive the high pressure brine during the next cycle.

The piston heads 26 move back and forth at a relatively slow rate, e.g., 2 cycles per minute. When the valve network 22 switches the connections to the chambers 24, it must do so under full flow, causing significant pressure pulsations to occur within the system. Disadvantageously, this makes the system difficult and expensive to maintain and operate. In addition, the extremely slow cycle rate results in large and bulky equipment. That is, such a slow FWE type system generally requires a very large installation area, i.e., it occupies a very large footprint. Furthermore, conventional plunger or centrifugal pumps are still required to provide the main pumping function, which devices suffer from the disadvantages mentioned previously.

Figure 2:
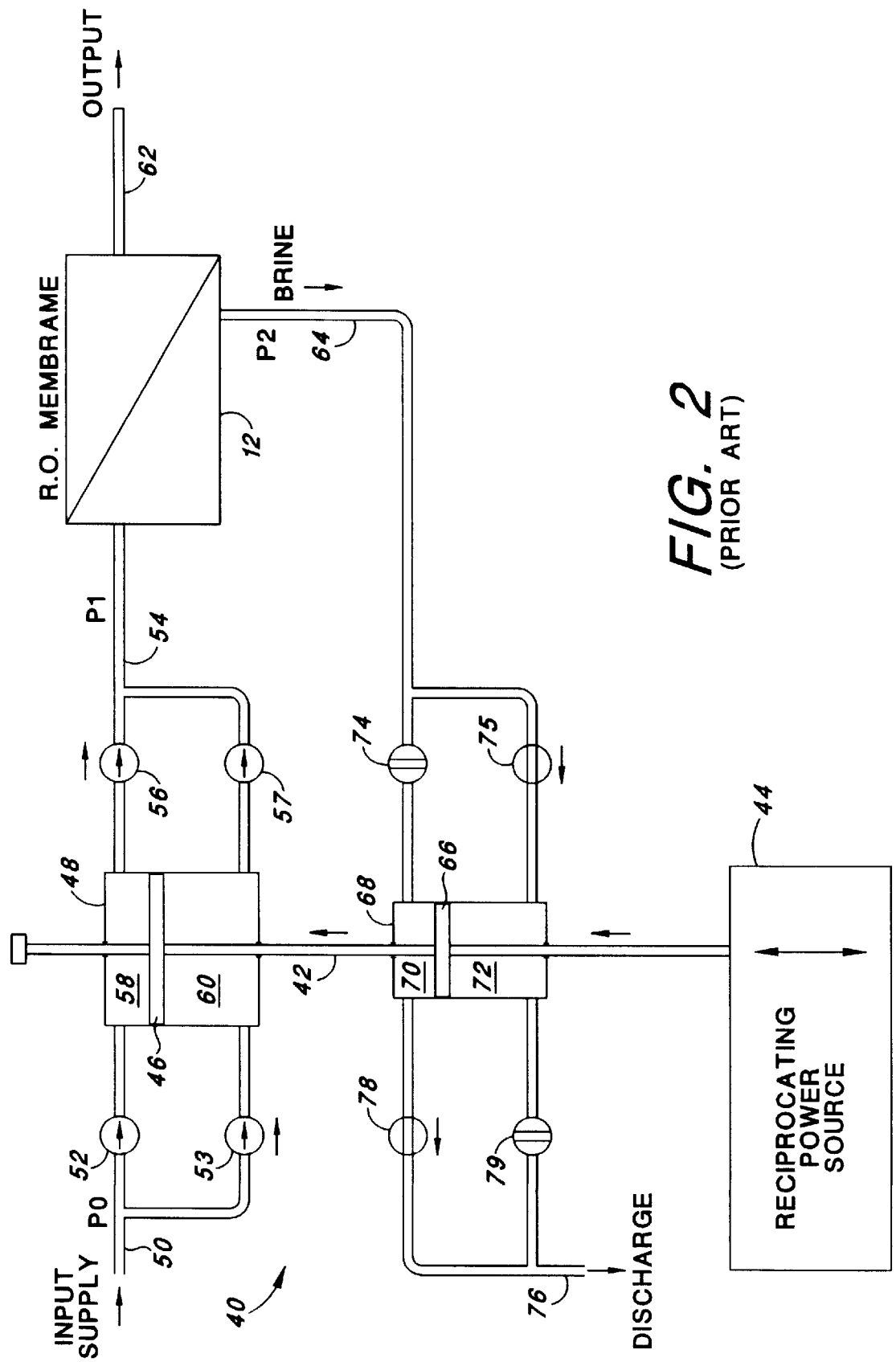
FIG. 2 is a block diagram of a prior art "bang-bang" type of energy recovery pumping system.

Turning next to FIG. 2, a block diagram of a prior art "bang-bang" type of energy recovery pumping system 40 is illustrated. The system includes a common piston shaft 42 connected to a reciprocating power source 44 consisting of a hydraulic pump and directional valve to reciprocate the shaft 42. A first piston 46 is connected to the shaft 42 and is mounted for reciprocating motion within a first cylinder 48. An input supply line 50 connects a source of fluid at pressure P0 through pressure valves 52 and 53 to the cylinder 48. An output supply line 54 is similarly connected to the cylinder 48 through pressure valves 56 and 57.

The piston 46 effectively divides the cylinder 48 into two working volumes. A first working volume 58 comprises that volume within the cylinder 48 bounded by the front (top) side of the piston 46. A second working volume 60 comprises that volume within the cylinder 48 bounded by the back (bottom) side of the piston 46. As the piston 46 is forced upward (as drawn in FIG. 2) with a forward stroke, the first working volume 58 contracts, and the second working volume 60 expands. As the piston 46 is forced downward with a backward stroke, the first working volume 58 expands and the second working volume 60 contracts.

Thus, in operation, during a forward (upward) stroke of the piston 46, fluid within the first working volume 58 of the cylinder 48 is compressed to pressure P1 and forced out through pressure valve 56 and directed to the RO membrane 12. During this same forward (upward) stroke, input fluid at pressure P0 is drawn through pressure valve 53 into the expanding second working volume 60 within the cylinder 48. During a backward (downward) stroke of the piston 46, the fluid within the second working volume 60 of the cylinder 48 is compressed to pressure P1 and forced out through pressure valve 57 and directed to the RO membrane 12; while input fluid at pressure P0 is drawn through pressure valve 52 into the expanding first working volume 58 within the cylinder 48. In this manner, the input fluid is pumped by the reciprocating piston 46 from the input supply 50 to input of the RO membrane 12. This pumping action increases the pressure of the fluid from a low pressure P0 at the input supply, e.g., a pressure of 30–50 psi, to a high pressure P1 at the input of the RO membrane, e.g., a pressure of 1000 psi. What has been described thus far in connection with FIG. 2 is simply a conventional reciprocating piston pump.

As with any RO system, when the fluid is presented to the RO membrane 12, a portion of such fluid is provided as the permeate output at output port 62. The remainder of the fluid is discharged from the membrane 12 at discharge line 64 as a high pressure brine stream at pressure P2. To recover energy from this high pressure brine stream, it is known in the art, see e.g., U.S. Pat. No. 3,825,122, to direct the high pressure brine stream to a second piston 66 mounted for reciprocation within a second cylinder 68. The second piston 66 is linked to the same piston shaft 42 that links the first piston 46 to the reciprocating power source 44. The second cylinder 68, sometimes referred to as an energy recovery cylinder, is divided into a first working volume 70 and a second working volume 72 by the piston 66. During a forward (upward) stroke of the piston 66, the first working volume within the second cylinder 68 contracts, and the second working volume expands. During a backward (downward) stroke of the piston 66, the first working volume 70 expands, and the second working volume 72 contracts. The high pressure brine stream is thus selectively connected to the first and second working volumes within the second cylinder 68 through valves 74 and 75. Similarly, a brine discharge port 76 is selectively connected to the first and second working volumes within the second cylinder 68 through valves 78 and 79. During a forward (upward) stroke, valve 74 is closed and valve 75 is opened so that the high pressure brine stream can contact the back side of piston 66 and the pressure P2 associated with the brine stream can help force the piston 66 forward (up) in its forward (upward) direction. In so doing, such force is also coupled through the shaft 42 to the pump piston 46, thereby reducing the amount of energy that the power source 44 would otherwise have to provide to the pump piston 46 during a forward stroke in order to pump the input fluid up to pressure P1. At this same time, valve 78 is open and valve 79 is closed, allowing any brine in the first working volume 70 of the second cylinder 68 to be expelled through discharge port 76.

During a backward (downward) stroke, valve 74 is opened and valve 75 is closed so that the high pressure brine stream can contact the front side of piston 66 and the pressure P2 associated with the brine stream can help force the piston 66 back (down) in its backward (downward) direction. In so doing, such force is also coupled through the shaft 42 to the pump piston 46, thereby reducing the amount of energy that the power source 44 would otherwise have to provide to the pump piston 46 during a backward stroke in order to pump the input fluid up to pressure P1. At this same time, valve 78 is closed and valve 79 is opened, allowing any brine in the second working volume 72 of the second cylinder 68 to be expelled through discharge port 76.

Note that the second cylinder 68 (the energy recovery cylinder) has first and second working volumes that are less than the first and second working volumes of the first cylinder 48. This is necessitated by the recovery ratio of the RO membrane. That is, if the recovery ratio of the RO membrane 12 is 30%, then that means the high pressure brine stream for any given pump cycle of the pump 40 (where a "pump cycle" comprises a forward and backward stroke of the pump piston 46) will have a volume that is 70% of the volume of the input fluid pumped during the same pump cycle. Hence, the volume of the second cylinder 68 need only be 70% of the volume of the first cylinder 48. Thus, some means must be employed to adjust the volume of the second cylinder 68 so that it can match the recovery ratio of the RO system.

There are several drawbacks associated with the energy recovery system shown in FIG. 2. First, the valves 74, 75 must be operated when full flow is applied thereto. This can cause significant pressure pulsing within the system 40. Second, there is always a high pressure differential (e.g., P1–P0 or P2) across the pistons 46 and 66. This leads to problems with maintaining the seals associated with such pistons, and generally reduces the life (number of strokes) that such cylinders may provide before having to be repaired or replaced. Third, the flow must completely stop and start during each cycle, resulting in a "bang-bang" type of operation.

Figure 3:
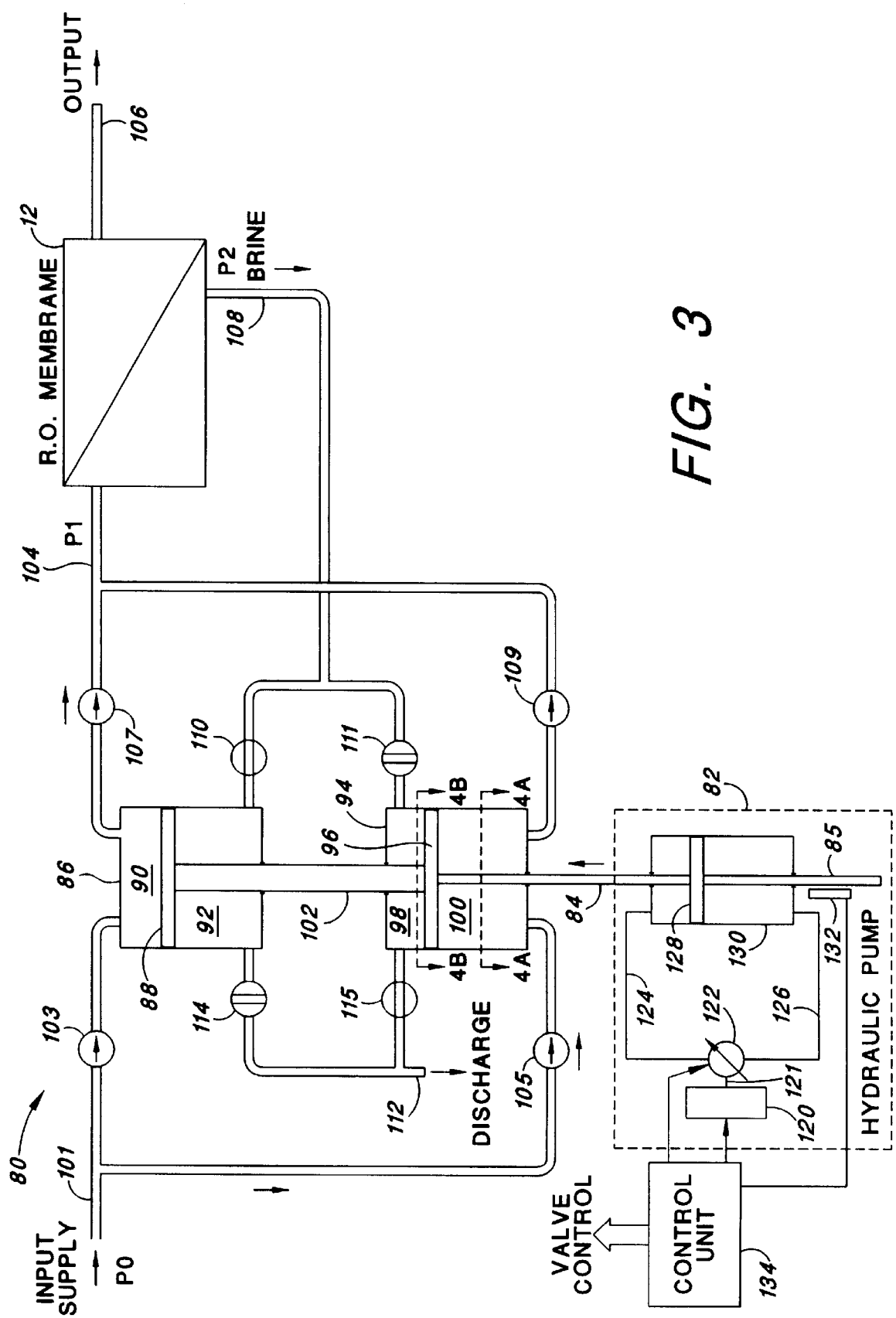
FIG. 3 is a simplified block diagram of an energy recovery system made in accordance with the present invention.

The present invention, while appearing at first glance to be similar to the prior art system shown in FIG. 2, is in fact much different, and as a result addresses the above-described drawbacks, as well as other shortcomings of prior art energy recovery pumping systems. A simplified block diagram of a double-action integrated energy recovery system 80 made in accordance with the present invention is depicted in FIG. 3. As seen in FIG. 3, the system 80 includes a hydraulic pump 82, or other power source, that provides the primary force for reciprocating a common piston rod or shaft 84 in a forward stroke and backward stroke motion. Two cylinders, each having a piston therein, are linked to the reciprocating piston rod 84. A first cylinder 86 has a first piston 88 mounted for reciprocating motion therein. This first piston 88 divides the first cylinder into a first working volume 90 and a second working volume 92, where the first working volume 90 contracts during a forward (upward) stroke of the piston 88, while the second working volume 92 expands during such forward stroke. Similarly, the first working volume 90 expands during a backward (downward) stroke of the piston 88, while the second working volume 92 contracts during such backward stroke. In a similar manner, a second cylinder 94 has a second piston 96 therein that divides the second cylinder into a first working volume 98 and a second working volume 100.

The first and second pistons 88 and 96 are mechanically linked to each other by an extension 102 of the reciprocating rod 84. Any reciprocating motion of the rod 84 causes joint motion of the piston 96, the extension 102, and the piston 88. Thus, during a forward (upward) stroke of the rod 84, the piston 96, as well as the piston 88, each piston moves from a fully retracted position (at or near the back or bottom end) to a fully extended position (at or near the front or top end) of its respective cylinder.

The power source 82 may be realized using any of several different types of reciprocating power sources. Common terminology associated with such reciprocating power sources extends the position of the piston rod 84 to a "top dead center" (TDC) position, and retracts the position of the piston rod to a "bottom dead center" (BDC) position. Thus, using this terminology, the most forward (up) position of the pistons 88 and 96 in their respective cylinders for a given cycle of a reciprocating power source may likewise be referred to as a TDC position, and the most backward (down) position for a given cycle of the reciprocating power source may be referred to as a BDC position. Note, also, that if the reciprocating power source has the ability to adjust its stroke length, as is the case with the preferred reciprocating power source used with the present invention (described below), then the TDC and BDC positions within the cylinder, as measured relative to, e.g., the middle or end of the cylinder, may vary from pump cycle to pump cycle as the stroke length varies.

Although shown as separate cylinders in the double-action embodiment shown in FIG. 3, it should be noted that the two cylinders 86 and 94 may be (and preferably are) integrated into a single cylinder housing, or water cylinder (WC), with a fixed cylinder wall (comprising the bottom of cylinder 86 and the top of cylinder 94, as drawn in FIG. 3) separating the two cylinders. Such single cylinder housing, or WC, can be visualized in FIG. 3 by simply dropping the cylinder 86 down on top of the cylinder 94, and shortening the extension rod 102 an appropriate amount. Although housed within a single cylinder housing, however, it is to be emphasized that, for the double-action embodiment, the two cylinders 86 and 94 still function as two separate cylinders, each having its respective piston 88 or 96 mounted for reciprocating motion therein, linked together by the rod 102.

A key aspect of the invention illustrated in FIG. 3, and an important difference between the present invention and that which is shown in FIG. 2, is that the input fluid supply, obtained at input header 101 at a modest pressure P0, is directed through pressure (one-way) valve 103 to the first working volume 90 of the first cylinder 86 and through pressure valve 105 to the second working volume 100 of the second cylinder 94. Similarly, the pumped output fluid, at a high pressure P1, is directed through pressure valve 107 from the first working volume 90 of the cylinder 86 to a high pressure output header 104, and through pressure valve 109 from the second working volume 100 of the cylinder 94 to the output header 104. The output header 104, in turn, connects with the input port of a RO membrane 12.

The RO membrane 12 provides a permeate output stream through output port 106 and a high pressure brine or concentrate stream (e.g., at pressure P2, where P2 is less than P1 by a small amount) at a discharge header or port 108. This high pressure brine stream is selectively connected through energy recovery valves 110 and 111 to either the second working volume 92 of the first cylinder 86 or to the first working volume 98 of the second cylinder 94. Brine is selectively discharged from the working volume 92 of the first cylinder 86 through discharge valve 114, and from working volume 98 through discharge valve 115, to a discharge port 112.

In operation, the high pressure brine stream is directed through one of the energy recovery valves 110 or 111 to whichever of the working volumes 92 or 98 is expanding or will expand during the current piston stroke. The high pressure P2 associated with the brine stream thus serves to force the respective piston (88 or 96) in the direction of the piston stroke. That is, during a forward (upward) stroke of the piston 88, the brine stream is connected through energy recovery valve 110 to working volume 92, thereby permitting the high pressure P2 of the brine stream to assist in forcing the piston 88 in its forward stroke. During this same forward stroke, the forward movement of piston 96 expels any brine remaining in working volume 98 out through discharge valve 115 to the discharge port. During a backward (downward) stroke of the pistons 88 and 96, the brine stream is connected through energy recovery valve 111 to working volume 98, thereby permitting the high pressure P2 of the brine stream to assist in forcing the piston 96 in its backward stroke. During this same backward stroke, the backward movement of piston 88 expels any brine remaining in working volume 92 out through discharge valve 114 to the discharge port.

By directing the high pressure brine stream into working volume 92 of the first cylinder and into working volume 98 of the second cylinder in this manner, the pressure differential across the pistons 88 and 96 is significantly reduced. That is, the pressure differential across piston 88 or 96 is essentially P1−P2, which is not a large pressure difference compared to the full pressure differential that exists across prior art reciprocating pump pistons of the type shown in FIG. 2. For example, if P1 is 1000 psi and P2 is 950 psi, then the pressure differential is only about 50 psi, which is not a large value. This low pressure differential significantly improves the operating life of the pistons 88 and 96 within their respective cylinders 86 and 94.

Also, as explained in greater detail below, an additional advantage of the invention shown in FIG. 3 is that the energy recovery valves 110 and 111, as well as the discharge valves 114 and 115, are switched from one position to another position (i.e., are switched from a CLOSED position to an OPEN position, or from an OPEN position to a CLOSED position) at a time during the pump cycle when the flow rate of the brine, as set by the velocity profile of the pistons 88 and 96, is essentially zero. This makes the switching of these valves a relatively painless and efficient process compared with what would be required if the valves were switched at a time of maximum, or moderate, or other non-zero flow rate.

In order to account for the difference in fluid volume occasioned by the Recovery Ratio of the RO membrane 12, the present invention advantageously provides a clever way of adjusting the magnitude of the working volumes 92 and 98, which receive the brine stream from the RO membrane, compared with the magnitude of the working volumes 90 and 100, which pump the input fluid to the RO membrane. This volume adjustment is complicated by the fact that the cylinder 86 and the cylinder 94, in the preferred embodiment, share a common outside and inside diameter, which means that the pistons 88 and 96 share a common diameter and circumference.

Figure 4A:
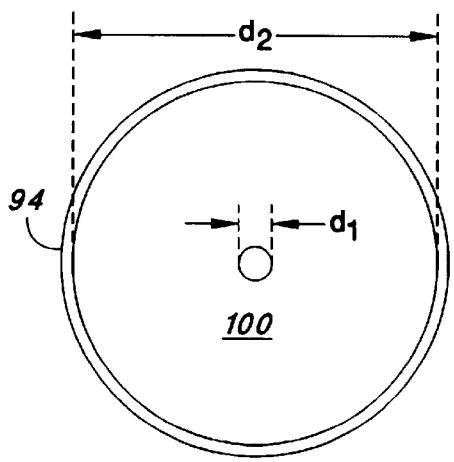
FIG. 4A is a cross-sectional view of the cylinder of FIG. 3 taken along the line 4A—4A.
Figure 4B:
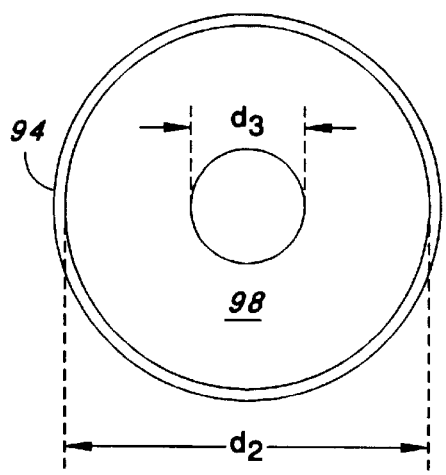
FIG. 4B is a cross-sectional view of the cylinder of FIG. 3 taken along the line 4B—4B.

As suggested in FIG. 3, and is seen more clearly in FIGS. 4A and 4B, to allow for a lesser volume within working volumes 92 and 98, the extension rod 102, which is also referred to as the "ratio rod" 102, has a larger diameter than does the basic piston rod 84. Thus, with reference to FIG. 4A, which is a cross-sectional representation of the cylinder 94 through the working volume 100, it is seen that the maximum working volume 100 may be expressed as being approximately equal to:

$$WV_{100}=(L[/4])[(d2)^2-(d1)^2]$$

where $WV_{100}$ is the maximum working volume 100, d2 is the diameter of the inside of cylinder 94, d1 is the diameter of the rod 84, and L is the stroke length, i.e., the linear distance that the piston 96 moves within the cylinder 94. In contrast, with reference to FIG. 4B, which is a cross-sectional representation of the cylinder 94 through the working volume 98, the maximum working volume 98 may be expressed as:

$$WV_{98}=(L[/4])[(d2)^2-(d3)^2]$$

where $WV_{98}$ is the maximum working volume 98, d2 is the diameter of the inside of the cylinder 94, d3 is the diameter of the rod 102, and L is the stroke length.

By way of illustration, assume a recovery ratio of 30%, which means that the volume of the working volume 98 should be approximately 70% of the volume of the working volume 100. If the inside diameter d2 of the cylinder 94 is 6 inches, and if the diameter d1 of the pump rod 84 is 0.75", then d3, the diameter of the ratio rod 102, should be about 3.35 inches.

Turning momentarily back to FIG. 3, it is noted that a control unit 134 generates the control signals needed to control the energy recovery valves 110 and 111, as well as the discharge valves 114 and 115. To aid in this process, a position sensor 132 monitors the linear position of the piston rod 84 so that the control unit receives feedback information regarding the location of the rod 84, and hence the location of the pistons 96 and 88, at any given time during the pump cycle. (As drawn in FIG. 3, the sensor 132 is positioned adjacent rod 85, which extends from a back end of the hydraulic cylinder 130 used within the hydraulic pump 82. However, this positioning is only exemplary, as such sensor could be positioned at any location along rod 85 or 84 or 102.) It should be recalled that a "pump cycle" comprises a full forward stroke followed by a full backward stroke of the piston rod 84. The control unit 134 further controls the hydraulic pump 82 throughout the pump cycle, as explained in more detail below, in order to impart a desired velocity profile to the piston rod, and the pistons connected thereto. The sensor 132 may be realized using any suitable linear sensor as is known in the art. The one-way pressure valves 103, 105, 107 and 109 may be realized using any suitable commercially-available pressure valve.

Still with reference to FIG. 3, it is noted that energy recovery valves 110 and 111, as well as the discharge valves 114 and 115, operate as a group. That is, at the beginning of a forward stroke and throughout the duration of the forward stroke, energy recovery valve 110 should be OPEN, energy recovery valve 111 should be CLOSED, discharge valve 114 should be CLOSED, and discharge valve 115 should be OPEN. At the beginning of a backward stroke and throughout the duration of the backward stroke, energy recovery valve 110 should be CLOSED, energy recovery valve 111 should be OPEN, discharge valve 114 should be OPEN, and discharge valve 115 should be CLOSED.

Any suitable valves or valve means may be used to implement the function of the energy recovery valves 110 and 111, as well as the discharge valves 114 and 115. Basically, the function of such valves is to be selectively adjusted to an OPEN or CLOSED position. Numerous types of valve means exist that fulfill this function. Such valves may not comprise a single unit, but may comprise a valve subsystem which includes one or more energy transducers to allow a low level electrical signal, e.g., an electrical signal generated by the control unit 134, to control the motion and state of an ON-OFF (CLOSED-OPEN) mechanical valve. Depending on the application, such valve subsystems may be obtained commercially or may be custom made and/or assembled using readily available components.

Figure 5:
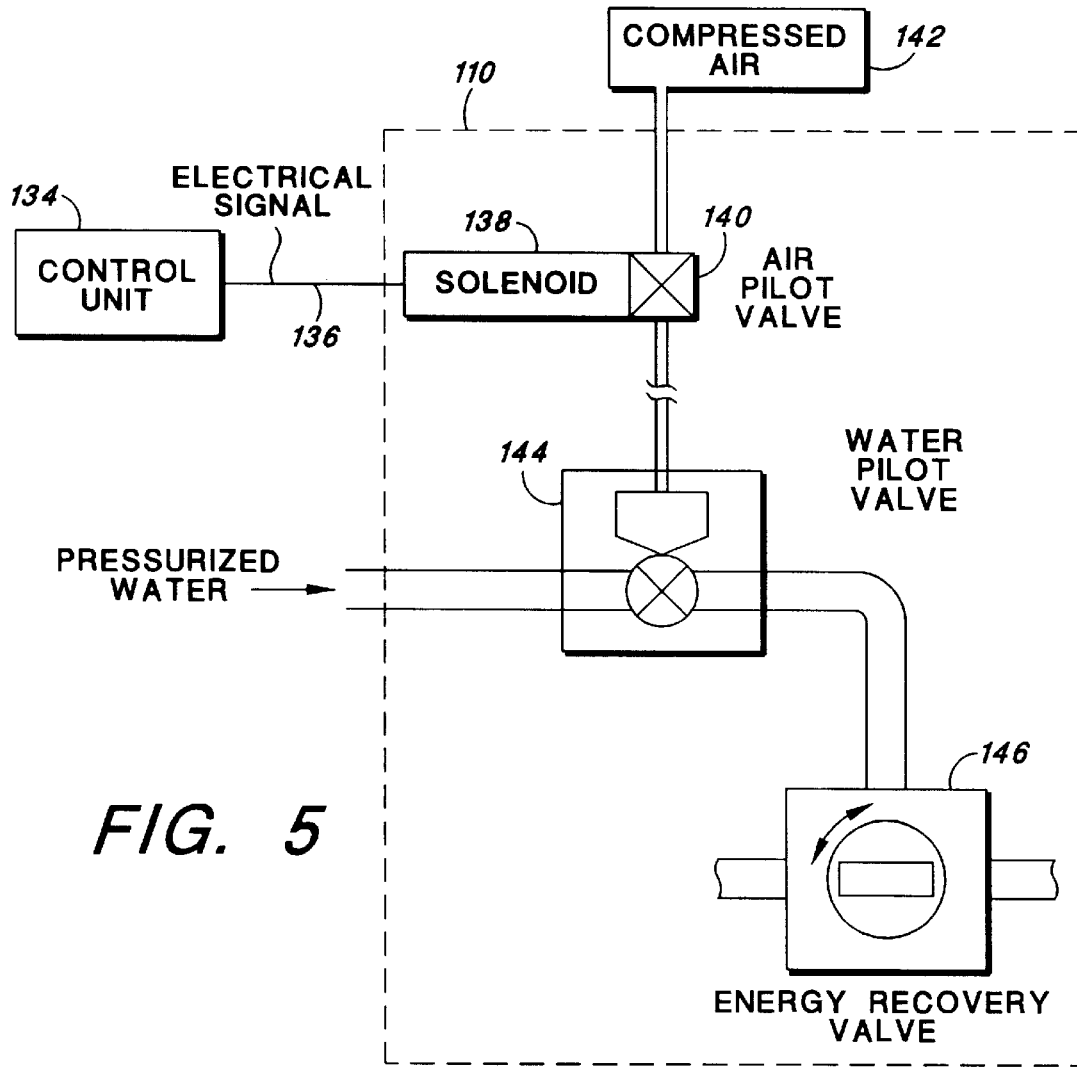
FIG. 5 is a block diagram of one type of energy recovery valve subsystem that may be used with the system shown in FIG. 3.

By way of example, one type of energy recovery valve subsystem that may be used with the invention is shown in FIG. 5. As seen in FIG. 5, the energy recovery valve 110 includes several components. The control unit 134 generates an electrical signal 136 that operates a conventional solenoid 138. The solenoid 138, in turn, operates an air pilot valve 140 that is coupled to a source of compressed air 142. When the air pilot valve 140 is opened by action of the solenoid 138, compressed air from the compressed-air source 142 operates a water pilot valve 144. When opened, the water pilot valve 144 connects a source of pressurized water to a open or close a mechanical valve 146. In this manner, then, the energy recovery valve 110 is operated to assume either a CLOSED or OPEN state by receipt of an electrical signal from the control unit 134.

It is to be emphasized that the valve subsystem depicted in FIG. 5 is only exemplary, and is not intended to be limiting. Any suitable valve means, or valve subsystem, that performs the function of opening or closing a fluid line on command may be used with the invention.

Returning to FIG. 3, it is seen that the hydraulic pump 82 functions as the power source for reciprocating the piston rod 84. Numerous types of power sources could be used to provide this function, any of which may be used with the present invention. However, a preferred power source is one that can impart a desired velocity profile to the piston rod 84. One type of power source that may be used to accomplish this objective is a power source of the type disclosed in one of applicant's earlier patents, U.S. Pat. No. 4,145,884, entitled "Reversible Power Transmission", which patent is incorporated herein by reference. As disclosed in the '884 patent, the hydraulic pump 82 includes a suitable engine or motor 120 which drives a power takeoff shaft 121. The power takeoff shaft 121, in turn, is connected to a variable volume positive displacement hydraulic power unit 122. Power unit 122 is a device that can on command produce zero to full hydraulic discharge flow through either hydraulic line 124 or line 126. Hydraulic line 124 connects to one end of hydraulic cylinder 130, and hydraulic line 126 connects to the opposite end of cylinder 130. Located in cylinder 130 is piston 128, and connected to opposite sides of piston 128 are piston rods 84 and 85, thereby producing a double-acting piston 128 operating in a closed loop manner with hydraulic power unit 122. Linear displacement of the double-acting piston 128 in cylinder 130 causes the exact same linear displacement of piston 96 in cylinder 94 and piston 88 in cylinder 86.

Figure 6:
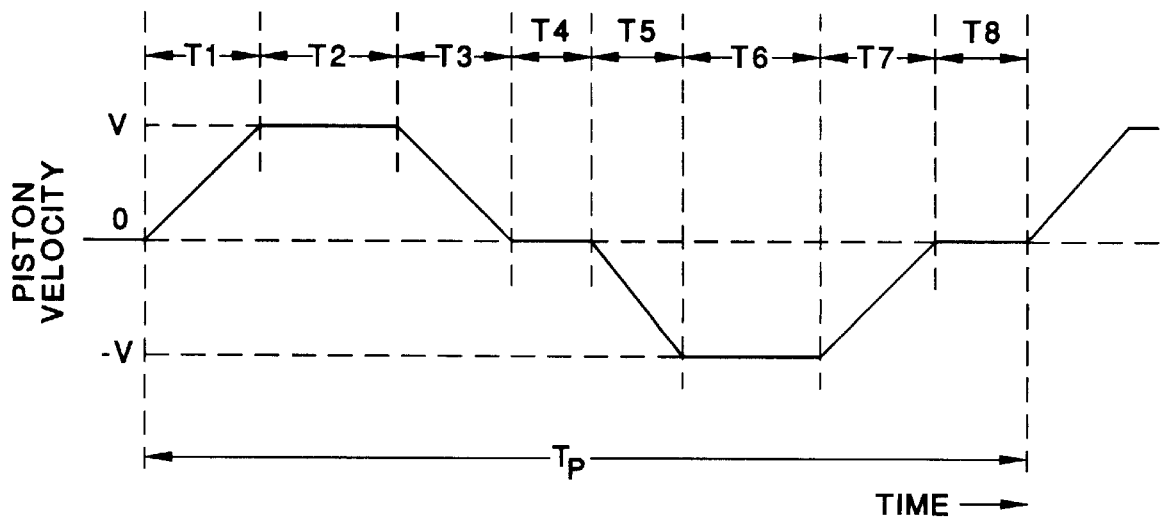
FIG. 6 depicts the preferred velocity profile, and hence the flow rate, as a function of time for each cycle of the hydraulic pump included in FIG. 3.

Because the hydraulic piston 128 operates in a closed loop manner with hydraulic power unit 122, the movement, i.e., acceleration, constant velocity, and deceleration, of the pistons 96 and 98 can be controlled to produce a desired piston velocity profile. Such a profile is depicted in FIG. 6. In FIG. 6, one pump cycle $T_p$ is illustrated, and it is assumed that the piston rod 84 (as well as the pistons 88 and 96, see FIG. 3) is in its fully retracted position, at the end of a backward stroke. The pump cycle starts with a forward stroke during which the rod is linearly accelerated from rest (zero velocity) up to a velocity V for a time period T1. Then, the velocity V is maintained for a time period T2 (a constant velocity period) as the rod continues its forward stroke. As the rod approaches the end of the forward stroke, a deceleration period T3 begins, during which the rod decelerates from velocity V to zero. Once the rod is stopped, at the conclusion of the forward stroke, it remains stopped for a short dwell time T4. As the rod begins its backward stroke, it is linearly accelerated in the backward direction to a velocity −V for a time period T5. The velocity −V is then maintained for a time period T6 (a constant velocity period) as the rod continues its backward stroke. As the rod approaches the end of the backward stroke, a deceleration period T7 begins during which the rod decelerates from velocity −V to zero. Once the rod is stopped, at the conclusion of the backward stroke, it remains stopped for a short dwell time T8.

The sensor 132 (FIG. 3) provides feedback information needed to control motion of the piston rod 84 through the time periods T1–T8 during a given pump cycle. Such feedback information is received and monitored by the control unit 134, and the control unit 134 then controls the power unit 122 to produce the desired linear motion of the piston rod 84.

The values of the time periods T1–T8 are dependant upon the particular application with which the energy recovery system is being employed. For an exemplary desalination RO system, employing pistons having a diameter of 8 inches, and a stroke length L=5 inches, representative approximate values for the time periods T1–T8 may be approximately as follows: T1=T3=T5=T7=0.75 seconds; T2=T6=1 second; T4=T8=0.5 seconds, making a pump cycle time $T_p$ of about 6 seconds, or a pump cycle rate of approximately 10 cycles per minute.

An important feature of the present invention is that the energy recovery valves 110 and 111 (FIG. 3), as well as the discharge valves 114 and 115, are switched from a CLOSED to an OPEN state, or from an OPEN to a CLOSED state, only during the dwell time periods T4 or T8. This limitation assures that the valves are switched at a time just before commencement of a forward or backward stroke when the flow rate of the fluid through the valves is zero. Such timing not only makes the mechanical closing or opening of the valves an easier and more efficient task (performed through the expenditure of less energy), but also improves the life of such valves.

That which has been described thus far in connection with FIGS. 3–6 relates to a double action embodiment of the invention. It is noted, however, that these same figures are also instructive to teach the single-action embodiment of the invention. With reference to FIG. 3, a single-action embodiment is realized by removing one of the cylinders 86 or 94, and using the other one to provide the pumping and energy recovery functions on a 50% duty cycle basis. That is, assume cylinder 94, and its associated valves 105, 109, 111 and 115, are removed from FIG. 3. That leaves just cylinder 86, with its piston 88, and associated valves 103, 107, 110 and 114. During a backstroke (down stroke, as drawn in FIG. 3) of the piston rod 84, the working volume 90 expands and receives the input fluid through valve 103, and the working volume 92 contracts and expels any brine contained therein through OPEN valve 114. During this backstroke, valve 110 is CLOSED, and pressure P1 effectively maintains valve 107 CLOSED. During the next half of the pump cycle, i.e., during the forward stroke of the piston rod 84, valve 114 is CLOSED, valve 110 is OPENED, and the pressure created by the contracting working volume 90 effectively closes valve 103 and opens valve 107. During this forward stroke, the input fluid is thus pumped through valve 107 to the RO membrane 12, and the brine, at pressure P2, feeds into the expanding working volume 92 and helps move the piston 88 along in its forward stroke. Thus, it is seen that in a single-action embodiment, wherein only one of the cylinders 86 or 94 is used, pumping and energy recovery occur during only one half of the pump cycle, with filling and expelling occurring during the other half of the pump cycle. The same advantages are present for the single-action embodiment as exist for the double-action embodiment, i.e., a low pressure differential is maintained across the piston.

It should be noted that that which is shown in simplified form in FIG. 3 is a complete integrated pumping and energy recovery system. Various subsets of that which is shown in FIG. 3 may also find applicability for different applications. For example, a feed water pumping subset could be implemented which includes a single cylinder having first and second working volumes 90 and 100 that performs the pumping function during both the forward stroke and backward stroke without energy recovery. Such pumping system could be used, e.g., for brackish desalting where the recovery ratio is quite high, and where energy recovery would not be cost effective.

Another subset would be a concentrate energy recovery system used to recover energy from the high pressure concentrate (brine), and then using such recovered energy to augment feed water pumping by other pumping methods, such as centrifugal and/or plunger pumps. Applications for such a concentrate energy recovery system would include, e.g., the retrofit of existing facilities where existing pumps are already in place and available for the feed water pumping.

Figure 7:
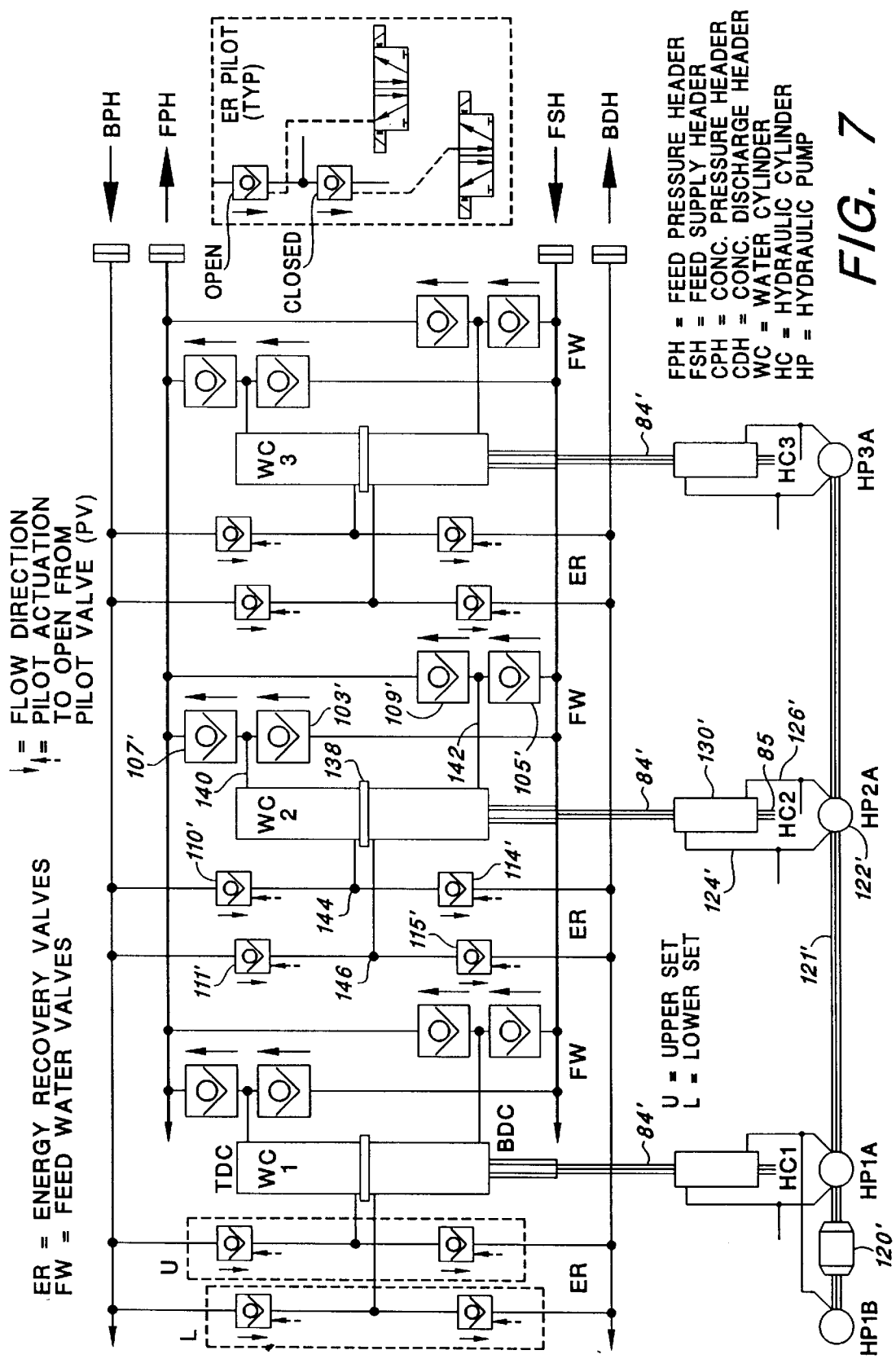
FIG. 7 is a block diagram of an energy recovery system made in accordance with the present invention utilizing three water displacement units (WDU's) connected in parallel with motion of their respective pistons being phased 120 degrees apart.

Turning next to FIG. 7, a block diagram is shown of a energy recovery system made in accordance with the present invention wherein three reciprocating pumps (each of the type described above in connection with FIGS. 3–6) are employed, each having the motion of their respective pistons phased to be 120 degrees apart. As depicted in FIG. 7, three "water cylinders" (WC), WC1, WC2 and WC3, are employed. Each of these water cylinders comprises first and second cylinders of the type shown in FIG. 3, with one being stacked on top of the other to give the appearance of a single cylinder. A dividing wall 138 separates each water cylinder into its respective first and second cylinders. With respect to WC2, for example, the lines 140 and 142 connected to the top and bottom of WC2, represent pipes (or other closed fluid channels) that are in fluid communication with the first working volume of the first cylinder and the second working volume of the second cylinder, as described previously in connection with FIG. 3. Similarly, the lines 144 and 146 connected to the middle of WC2, one on each side of the dividing wall 138, represent pipes that are in fluid communication with the second working volume of the first cylinder and the first working volume of the second cylinder, as described previously in connection with FIG. 3.

Still with reference to WC2 of FIG. 7, pressure valves 103' and 105' correspond to the pressure valves 103 and 105 shown in FIG. 3, and connect a feed supply header, FSH, to the first working volume of the first cylinder and the second working volume of the second cylinder, respectively, of WC2. In like manner, pressure valves 107' and 109' correspond to the pressure valves 107 and 109 shown in FIG. 3, and connect the first working volume of the first cylinder in WC2, and the second working volume of the second cylinder in WC2, to a feed pressure header, FPH. Energy recovery valves 110' and 111' correspond to the energy recovery valves 110 and 111 shown in FIG. 3, and selectively connect a brine pressure header, BPH, to either the second working volume within the first cylinder of WC2, or to the first working volume within the second cylinder of WC2. Discharge valves 114' and 115' correspond to the discharge valves 114 and 115 in FIG. 3, and selectively connect either the second working volume in the first cylinder, or the first working volume in the second cylinder to a brine discharge header, BDH. A hydraulic cylinder 130' drives a rod 84' through forward and backward strokes during each pump cycle. The hydraulic cylinder 130' includes a double-acting piston therein that is driven forward or backward by hydraulic fluid pumped through lines 124' and/or 126' as controlled by power unit 122'. Power unit 122' is driven by a power takeoff shaft 121', which is powered by a motor 120'. Power unit 122' is controlled by a control unit.

Still referring to FIG. 7, each of the water cylinders WC1 and WC3 shown in FIG. 7 include corresponding valves and controls as explained above in connection with WC2. The explanation of such additional water cylinders and their associated valves is the same as that presented above in connection with WC2, so it will not be repeated.

It should be noted that any number of energy recovery pumps of the type shown in FIG. 3, or water cylinders (as they are labeled in FIG. 7) along with their associated valves and controls, may be connected in parallel to produce a desired high pressure output. In FIG. 7, three such pumps, or water cylinders, are shown as being connected in parallel. However, this number is only exemplary. Any number n of water cylinders, with associated valves, could be so connected. Typically, n is an odd integer, such as three or five, but it need not be so limited.

Figure 8:
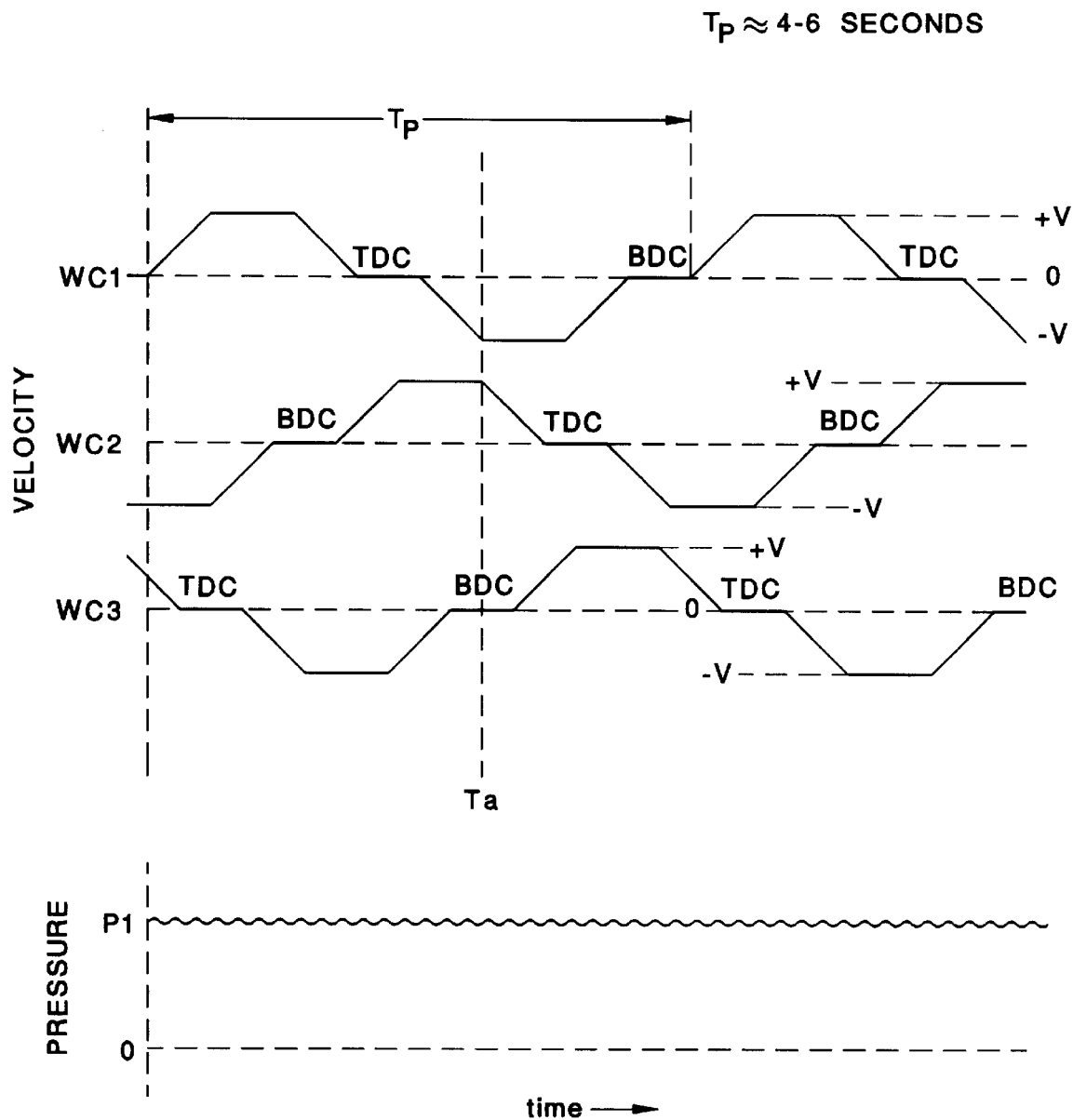
FIG. 8 depicts the velocity profile and pressure achieved, as a function of time, for each cycle of the energy recovery pump depicted in FIG. 7.

In operation, the movement of the rods 84' associated respectively, with each of WC1, WC2 and WC3 in FIG. 7 is timed or phased so that as one piston approaches its constant velocity position, another is just leaving its constant velocity position, and yet another is at its BDC position. Such timing or phasing is illustrated in FIG. 8, which shows the velocity profile associated with the pistons of each water cylinder WC1, WC2 and WC3 of FIG. 7. As seen in FIG. 8, at time Ta, when WC1 is nearing the end of its acceleration period in the backward direction, WC2 is at the end of its constant velocity period in the forward direction, and WC3 is at its BDC position. By phasing the motion of the cylinders in this manner, a fairly constant pressure P1, without undesirable pressure fluctuations, is obtained at the feed pressure header, FPH. Such constant pressure P1 is also illustrated in FIG. 8.

In general, if n WC's are employed in a given system, then the relative phasing between the respective pistons of each of the n WC's should be 360°/n.

Control of the system of FIG. 7 is achieved by any suitable control capable of steering the hydraulic pump to produce the desired velocity profile for the pistons associated with each cylinder. Such control is readily achieved by those of skill in the art using a personal computer, or equivalent processor, programmed to drive the piston rods 84' of each cylinder to track the velocity profile shown in FIG. 8. Such tracking is readily achieved using the hydraulic pump of the type described in the '884 patent, previously incorporated herein by reference, because such pump operates in a closed loop fashion. Other types of devices that provide the desired phased relationship may also be used, such as e.g., direction valves, servo valves, etc. Hence, by using the position sensor 132 (FIG. 3) associated with the rod 84' of each cylinder to track the location of the rod, it is possible to control the motion of the rod 84' to produce the desired velocity profile.

A pilot Reverse Osmosis Water Desalination Pumping System having a capacity of 30,000 gallons per day (GPD) was constructed in accordance with the present invention, substantially as shown in FIG. 7. Test results from such pilot plant to date have been very encouraging. The test results indicate that specific energy consumption (SEC) is 20% to 50% less than other commercially available systems in this capacity range using conventional pumps with energy recovery turbines. These tests were performed at a Recovery Ratio of 28% and with a simulated membrane pressure of 1000 psi. The system may be readily configured for higher recovery ratios and pressures up to 1200 psi.

Typical energy requirements for high pressure pumps with energy recovery devices for seawater desalting installations around the world are shown in Table 1. The table projects the cost savings potential that can be provided by using a system as described herein. As seen in Table 1, based on the conditions assumed, the energy savings range from 28% to 56%. In Table 1, "Invention" refers to the integrated pumping and energy recovery system of the present invention; the abbreviation "MGD" refers to "millions of gallons per day"; "M" refers to "million"; "kWh" refers to "kilowatt-hour"; "KGal" refers to 1000 gallons; and "$" refers to United States dollars.

The overall cycle time of each pump associated with each water cylinder of the pilot plant is on the order of 10–15 cycles per minute. This is a moderately slow cycle rate for positive displacement pumping systems of the type normally used with desalination systems. By way of comparison, a conventional positive displacement system typically operates at approximately 300 revolutions per minute. A slower rate is generally preferred because it reduces the wear on the moving components of the system. However, a rate that is too slow, e.g., 1 or 2 cycles per minute, as is used in some of the FWE types of systems known in the art, is also not desirable because large pressure fluctuations may result when such a system changes its valving connections at the conclusion of a stroke. Hence, the cycle rate of the pump used with the present invention provides a workable compromise between prior art rates that are either too fast or too slow.

As described above, it is thus seen that the present invention provides a positive displacement energy recovery pumping system, particularly adapted for use with a reverse osmosis seawater desalination system, wherein significant savings in operating cost are realized, thereby making the extraction of pure water from sea water, for example, economically viable.

As further described above, it is seen that the invention provides an efficient energy-recovery pump that operates at a relatively slow speed, e.g., with a pump cycle rate of only about 10–15 cycles per minute, even though the other operating parameters of the pump, e.g., flow rate and output pressure, remain competitive with other pumping systems. Significantly, during operation of the pump the pressure differential across the pistons of the pump remains relatively low, thereby improving the operating life of the pistons and associated seals used therewith. Further, during operation of the pump, the energy recovery valves are switched from one position to another during a given pump cycle only when the pump pistons are stopped for the short dwell time at the end of a forward or backward stroke. Such action advantageously reduces the wear and tear on such valves, and thereby increases their useful life.

While the invention herein disclosed has been described by means of specific embodiments and applications thereof, numerous modifications and variations could be made thereto by those skilled in the art without departing from the scope of the invention set forth in the claims.

What is claimed is:

1. A positive displacement, energy recovery, fluid pump comprising:

TABLE 1

| | | Projected Energy Cost Savings | | | | |
|---|---|---|---|---|---|---|
| | | Energy Consumption | | ENERGY | COST SAVINGS | |
| Seawater Location | Capacity MGD | kWh/KGal Now | % Invention SAVED | Cost $/kWh | $/KGal | Total Over 5 YEARS ($M) |
| Oceanic | 1 | 14.5 | 10 | 31 | 0.08 | 0.36 | 0.65 |
| Caribbean | 3 | 14.9 | 10 | 28 | 0.10 | 0.39 | 2.15 |
| Mediterranean | 6 | 14.6 | 10 | 32 | 0.08 | 0.37 | 4.03 |
| Red Sea | 12 | 19.0 | 10 | 47 | 0.04 | 0.36 | 7.90 |
| Arabian Gulf | 6 | 22.9 | 10 | 56 | 0.04 | 0.52 | 5.64 |
| Arabian Gulf | 24 | 22.9 | 10 | 56 | 0.04 | 0.52 | 22.57 | cylinder means wherein a piston is mounted for reciprocating motion, said piston defining a first working volume within said cylinder bounded by one side of the piston and a second working volume bounded by the other side of the piston;

controlled power means coupled to the piston for generating forces that move the piston through a pump cycle that comprises a forward stroke and a backward stroke;

said controlled power means including means for creating a dwell period during which the piston is stopped at the end of each forward and backward stroke;

first valve means for directing a first fluid available at an input header into the first working volume when the piston stroke direction causes the first working volume to expand, and for allowing the first fluid to flow out of the first working volume under pressure to an output header when the piston stroke direction causes the first working volume to contract;

second valve means including an inlet valve and a discharge valve for selectively directing a second fluid under pressure into the second working volume when the piston stroke direction causes the second working volume to expand, and for directing the second fluid out of the second working volume to a discharge header when the piston stroke direction causes the second working volume to contract; and a control unit for selectively opening and closing the inlet and discharge valves of second valve means only during the dwell periods, whereby a pressure force associated with the second fluid augments the forces produced by said power means to thereby assist in moving the piston through at least a portion of its pump cycle and whereby wear on the valves of said second valve means is significantly reduced.

2. The positive displacement, energy recovery pump of claim 1 wherein the controlled power means also includes means for controlling the piston motion during each piston stroke to pass through an acceleration period, a constant velocity period, and a deceleration period.

3. The positive displacement, energy recovery pump of claim 2 further including means for coupling the first fluid under pressure available at the output header to a membrane system, the membrane system producing an permeate output and a concentrate output; and means for coupling the concentrate output through the second valve means into the second working volume, whereby the concentrate output comprises the second fluid.

4. The positive displacement, energy recovery pump of claim 2 further including a plurality of cylinder means, each driven by a respective controlled power means, and wherein the controlled power means of each cylinder means controls the phase relationship between the respective pistons within each cylinder means, wherein a phase difference of 360°/n is produced between the piston movement within each of the plurality of cylinder means, where n is the number of cylinder means.

5. The positive displacement, energy recovery pump of claim 1 wherein each cylinder means comprises first and second cylinders, each having a respective piston, the respective pistons being linked for joint movement, whereby movement of one piston forces movement of the other piston, each of the first and second pistons being divided into first and second working volumes by its respective piston.

6. The positive displacement, energy recovery pump of claim 9 wherein the first valve means comprises input valve means and output valve means, wherein:

the input valve means comprises means for coupling the first fluid from the input header into the first working volume of the first cylinder when the piston stroke direction causes the first working volume within the first cylinder to expand, and into the second working volume of the second cylinder when the piston stroke direction causes the second working volume within the second cylinder to expand, and the output valve means comprises means for allowing the first fluid to flow under pressure to the output header from the first working volume of the first cylinder when the piston stroke direction causes the first working volume of the first cylinder to contract, and to flow from the second working volume of the second cylinder when the piston stroke direction causes the second working volume of the second cylinder to contract;

wherein the first fluid enters the first working volume of the first cylinder during the same piston stroke that it is pumped from the second working volume of the second cylinder, and enters the second working volume of the second cylinder during the same piston stroke that it is pumped from the first working volume of the first cylinder;

whereby pumping occurs during each piston stroke direction.

7. The fluid pump of claim 12 further including means for controlling the power source to force the first and second pistons to move in a reciprocating manner in accordance with a prescribed velocity profile between a bottom dead center (BDC) point to a top dead center (TDC) point and back to the BDC point within their respective first and second cylinders; and wherein one cycle of said pump comprises reciprocating piston motion from the BDC point through the TDC point and back to the BDC point for each of said first and second pistons.

8. The fluid pump of claim 7 wherein said first and second pistons are connected in tandem, with a first piston rod connected between the power source and a back side of the second piston, and with a second piston rod connected between the front side of the second piston and the back side of the first piston.

9. The fluid pump of claim 12 wherein the input valving means and the output valving means comprise pressure valves that allow fluid flow therethrough only in one direction when sufficient pressure exists to support said fluid flow, and which block fluid flow in the opposite direction.

10. The fluid pump of claim 12 wherein the control unit includes a position sensor that generates a position signal indicative of the position of the first or second piston within their respective cylinders, and processing means responsive to the position signal for generating control signals to open and close said valving means only when the position signal indicates the first and second pistons are at or near their TDC and BDC positions.

11. The fluid pump of claim 10 wherein the controlled power source includes a variable volume positive displacement hydraulic power unit and wherein the processing means, responsive to the position signal, further generates control signals for controlling the hydraulic power unit to produce a desired velocity profile for said first and second pistons.

12. The fluid pump of claim 8 wherein the first working volume of the first cylinder and the second working volume of the second cylinder have first displacement volumes that are approximately equal, and wherein the second working volume of the first cylinder and the first working volume of the second cylinder have second displacement volumes that are approximately equal, said second displacement volume being less than said first displacement volume, and wherein displacement volume is defined as the working volume that is displaced as the relevant piston travels from its BDC point to its TDC point within the cylinder.

13. The fluid pump of claim 12 wherein the second piston rod has a larger diameter than the first piston rod, thereby making the second displacement volume, which is a function of the diameter of the second piston rod and the diameter of the first and second cylinders, less than the first displacement volume, thereby creating a difference between a volume of fluid pumped through the first working volume of the first cylinder and second working volume of the second cylinder relative to a volume of fluid received under pressure in the second working volume of the first cylinder and the first working volume in the second cylinder during a pump cycle.

14. An energy recovery pump comprising:

a fluid pump having a first piston rod which reciprocates between a bottom dead center (BDC) position and a top dead center (TDC) position during one pump cycle, the BDC position being separated from the TDC position by a linear distance L;

a cylinder housing having an inside diameter D and having first and second piston chambers therein;

first and second pistons slidably connected in tandem within said first and second piston chambers, respectively, the first piston having a diameter of approximately D and having an upper and lower surface, and the second piston also having a diameter of approximately D and having an upper and lower surface, the lower surface of the first cylinder being mechanically linked with the upper surface of the second cylinder by a second piston rod, at least one of the first and second pistons being mechanically linked for reciprocating motion with said first piston rod, whereby both the first and second pistons slide within their respective first or second piston chambers within said cylinder housing a distance L as the first piston rod reciprocates between the BDC and TDC positions;

the first piston chamber being divided into first and second working volumes by the first piston, with the volume within the first piston chamber partially bounded by the upper surface of the first piston comprising the first working volume, and the volume within the first piston chamber partially bounded by the lower surface of the first piston comprising the second working volume;

the second piston chamber similarly being divided into third and fourth working volumes by the second piston, with the volume within the second piston chamber partially bounded by the upper surface of the second piston comprising the third working volume, and the volume within the second piston chamber partially bounded by the lower surface of the second piston comprising the fourth working volume;

a feed line;
a pressurized output line;
an energy recovery line;
a discharge line;

first valving means for establishing fluid communication between the feed line and whichever of the first or fourth working volumes is expanding as the first and second pistons move within their respective first and second piston chambers, and for establishing fluid communication between the pressurized output line and whichever of the first or fourth working volumes is contracting as the first and second pistons move within their respective first and second piston chambers, whereby a fluid made available through the feed line will flow into whichever of the first or fourth working volumes is expanding and will then be pumped therefrom under pressure to the pressurized output line when the first or fourth working volume is subsequently contracting; and second valving means for establishing fluid communication between the energy recovery line and the second working volume, and between the discharge line and the third working volume, whenever the first piston rod is at its BDC position; and for establishing fluid communication between the energy recovery line and the third working volume, and between the discharge line and the second working volume, whenever the first piston rod is at is TDC position;

whereby the energy recovery line is in fluid communication with whichever of the second or third working volumes is about to expand so that a pressure force associated with a pressurized fluid made available in the energy recovery line assists in moving the first and second pistons during the pump cycle by working against the lower surface of the first piston within the second working volume, or against the upper surface of the second piston within the third working volume, whichever working volume is about to expand; and whereby the discharge line is alternately placed in fluid communication with whichever of the second or third working volumes is about to contract so that a fluid present in the second or third working volumes will be discharged therethrouqh as the working volume contracts, said controlled power means including means for creating a dwell period during which the piston is stopped at the end of each forward and backward stroke and a control unit for selectively opening and closing the second valving means only during one of the dwell periods so that wear on said valving means is significantly reduced.

15. The energy recovery pump of claim 14 wherein a semipermeable membrane separation unit is connected to the pressurized outlet line which unit separates the fluid pumped thereto into two streams, one of which flows into the energy recovery line, wherein the first working volume of the first pump cylinder has a first maximum value, when the first piston rod is at its BDC position, that is substantially equal to a maximum value of the fourth working volume of the second pump cylinder, when the first piston rod is at its TDC position; and wherein the second working volume of the first pump cylinder has a second maximum value, when the first piston rod is at its TDC position, that is substantially equal to a maximum value of the third working volume of the second pump cylinder, when the first piston road is at its BDC position, which second maximum value is less than the first maximum value by a factor R which is equal to the ratio between the volume of flow through the first valving means in the pressurized output line and the volume of flow through the energy recovery line and the second valving means.

16. The energy recovery pump of claim 15 wherein the second piston rod has a diameter different from that of the first piston rod, and wherein the second maximum value of the second and third working volumes is equal to $$(L[/4][(D)^2-(d1)^2],$$

where d1 is the diameter of the second piston rod.

17. The energy recovery pump of claim 14 wherein the second valving means comprises
   a first pair of ON/OFF valves for alternately coupling the second working volume of the first piston chamber with a selected one of the energy recovery line or the discharge line, an "HP" valve of the first pair connecting the second working volume with the energy recovery line, and an "LP" valve of the first pair connecting the second working volume with the discharge line;
   a second pair of ON/OFF valves for alternately coupling the third working volume of the second piston chamber with a selected one of the energy recovery line or the discharge line, an "HP" valve of the second pair connecting the third working volume with the energy recovery line, and an "LP" valve of the second pair connecting the third working volume with the discharge line;
   means for determining when the first piston rod has reached its TDC and BDC positions,
   means responsive to said TDC/BDC determining means for opening and closing the first and second pair of ON/OFF valves only when the first piston is at its TDC or BDC position, corresponding to a time in the pump cycle when there is zero fluid flow through the first and second pair of valves.

18. An energy-recovery pump comprising:
   first and second sealed chambers each having an inlet port, an outlet port, an energy-recovery port and a discharge port;
   first and second pistons mounted for movement within said first and second sealed chambers, respectively, each piston having a front side and a back side;
   a common piston shaft interconnecting said first and second pistons so that they move in unison;
   a controlled power source coupled to the interconnected pistons that applies a force thereto to cause said first and second pistons to move within their respective sealed chambers in a pump cycle;
   wherein the pump cycle comprises a forward-stroke portion during which the first piston reduces a first working volume within the first chamber, which volume is partially bounded by the front side of the first piston, and a back-stroke portion during which the first piston moves to reduce a second working volume within the first chamber, which volume is partially bounded by the back side of the respective piston, said second chamber having working volumes corresponding to the first and second working volumes of the first chamber,
   said inlet and outlet ports being in fluid communication with said first working volume and said energy-recovery and discharge ports being in fluid communication with said second working volume,
   an input header in fluid communication with an input fluid source;
   an output header in fluid communication with each output port;
   a return header for carrying fluid which was pumped through the outlet header back to the pump;
   check valves in the input header leading to each inlet port;
   check valves in the output header associated with each outlet port;
   whereby a fluid received into the first working volume of the first chamber during the back-stroke portion of the pump cycle is pumped therefrom through its output port during the following forward-stroke portion of the pump cycle, and further whereby fluid received into the corresponding volume of the second chamber during the forward-stroke portion of the pump cycle is pumped therefrom through its output port during the next back-stroke portion of the pump cycle, whereby each forward-stroke or back-stroke of the pump cycle pumps fluid to the output header;
   energy-recovery valves that selectively open and close to establish fluid connections between the energy-recovery ports and the return header;
   discharge valves that selectively open and close to permit flow from the discharge ports; and
   a control unit which includes means for creating a dwell period during which the pistons are stopped at the end of each forward or back stroke and means for selectively opening and closing the energy-recovery and discharge valves only during the dwell periods, wherein the energy-recovery valve associated with the first chamber and the discharge valve associated with the second chamber are opened following completion of the back-stroke portion and before commencement of the forward-stroke portion of the pump cycle so that the energy-recovery port of the first chamber is connected to the return header while the discharge port thereof is closed, and wherein following completion of the forward-stroke portion and before commencement of the back-stroke portion of the pump cycle, the energy-recovery valve of the first chamber is closed and its discharge valve is opened;
   whereby fluid under pressure in the return header provides force to the back side of the first piston during the forward-stroke portion of the pump cycle, and to the front side of the second piston during the back-stroke portion of the pump cycle, thereby supplementing the forward-stroke and back-stroke forces provided by the controlled power source.

19. The energy-recovery pump of claim 18 wherein the controlled power source comprises a reciprocating power source which produces forward stroke and back stroke forces that are coupled to the interconnected pistons via a second piston shaft which is coaxial with the common piston shaft.

20. The energy-recovery pump of claim 19 wherein the control unit further includes means for causing the reciprocating power source to undergo controlled deceleration just prior to the dwell period at the end of each forward stroke and back stroke.

21. The energy-recovery pump of claim 19 wherein the controlled power source includes a variable volume positive displacement hydraulic power unit which applies forces to said common piston shaft during each forward-stroke and back-stroke portion which: (1) accelerate the shaft motion for a first time period, (2) maintain the shaft motion at a constant velocity for a second time period, (3) decelerate the shaft motion for a third time period, and (4) stop the stroke motion for the dwell period.

22. The energy-recovery pump of claim 21 in combination with a filtering unit that is coupled to the output header, the filtering unit having a filtered output line through which filtered fluid flows and a non-filtered output line through which non-filtered fluid flows into the return header at a pressure less than the pressure of the pumped fluid in the output header from the pump.

23. The combination of a filtering unit and a positive displacement, energy recovery, fluid pump that is driven by a controlled reciprocating power source, wherein an input fluid stream is pumped to the filtering unit at a high pressure, and wherein an outlet fluid stream exits the filtering unit under lower pressure, comprising:

a first piston mounted for reciprocating movement within a first cylinder so as to separate said first cylinder into first and second working volumes whereby, when the first piston reciprocates within the first cylinder, the first working volume increases as the second working volume decreases, and vice versa;

a second piston mounted for reciprocating movement within a second cylinder so as to separate said second cylinder into first and second working volumes whereby when the second piston reciprocates within the second cylinder, the first working volume increases as the second working volume decreases, and vice versa;

a common piston rod interconnecting said first and second pistons;

linkage means for mechanically linking the controlled reciprocating power source to the first and second interconnected pistons so that both are reciprocated by the power source at the same time, wherein the first working volume of the first cylinder and the second working volume of the second cylinder increase in volume at the same time, and vice versa;

means for establishing fluid communication between a source of input fluid and whichever of the first working volumes is increasing in volume during a piston stroke so as to receive the input fluid;

means for establishing fluid communication between the filtering unit and an output port on whichever first working volume is decreasing in volume during a piston stroke, whereby the fluid therewithin is pumped to the filtering unit;

energy recovery valving means for establishing fluid communication between the lower pressure outlet fluid stream exiting from the filtering unit and whichever second working volume that is increasing in volume during a piston stroke, whereby the lower pressure outlet fluid assists the reciprocating power force in driving either the first or second piston to pump fluid from that respective cylinder on the forward stroke;

discharge valving means for opening and closing a discharge port on each cylinder in communication with the second working volume, whereby the fluid contained within the second working volume is discharged through the discharge port as the second working volume decreases on the rearward stroke, and a control unit which includes means for creating a dwell period during which each of said interconnected pistons is stopped at the end of each forward and rearward piston stroke; and means for selectively opening and closing the energy recovery valving means and the discharge valving means only during the dwell periods, whereby wear on such valving means is significantly reduced.

24. The combination of claim 23 wherein the control unit includes:

a position sensor that generates a position signal indicative of the position of the first and second pistons within their respective cylinders, and processing means responsive to the position signal for generating control signals to open and close said valving means only when the position signal indicates the first and second pistons are at the end of either their forward or rearward stroke.

25. The combination of claim 24 wherein the control unit further includes means for causing the reciprocating power source to undergo controlled deceleration just prior to the dwell period at the end of each forward stroke and rearward stroke.

26. The combination of claim 25 wherein the controlled power source includes a variable volume positive displacement hydraulic power unit and wherein the processing means, responsive to the position signal, further generates control signals for controlling the hydraulic power unit to produce a desired velocity profile for said first and second pistons.

27. The combination of claim 23 wherein the first working volumes of the cylinders are approximately equal, and wherein the second working volumes of the cylinders are also approximately equal.

28. The combination of claim 22 wherein the diameter of the common piston rod is sized to reduce the second working volume of each cylinder to an amount less than the first working volume proportionate to the ratio between the volume of the input stream pumped to the filtering unit and the volume of the outlet stream exiting therefrom.

29. The combination of three energy-recovery pumps and a semipermeable membrane filtering unit which produces a permeate stream and a concentrate stream, each said pump comprising:

a cylinder having an inside diameter D and having first and second piston chambers therein;

first and second pistons slidably interconnected by a common piston rod so as to reciprocate in tandem within said first and second piston chambers, respectively, between a bottom dead center (BDC) position and a top dead center (TDC) position, the BDC position being separated from the TDC position by a linear distance L, the pistons having diameters of approximately D and having upper and lower surfaces, the lower surface of the first piston being mechanically linked with the upper surface of the second piston by the common piston rod, one of the first and second pistons being mechanically linked for reciprocating motion with a drive piston rod, whereby both the first and second pistons slide within their respective first or second piston chambers within said cylinder housing a distance L between the respective BDC and TDC positions;

the first piston chamber being divided into first and second working volumes by the first piston, with the volume within the first piston chamber partially bounded by the upper surface of the first piston comprising the first working volume, and the volume within the first piston chamber partially bounded by the lower surface of the first piston comprising the second working volume;

the second piston chamber being similarly divided into third and fourth working volumes by the second piston, with the volume within the second piston chamber partially bounded by the upper surface of the second piston comprising the third working volume, and the volume within the second piston chamber partially bounded by the lower surface of the second piston comprising the fourth working volume;

a feed line;

a pressurized line leading to the filtering unit;

an energy recovery line carrying the concentrate stream from the filtering unit;

a discharge line;

first valving means for establishing fluid communication between the feed line and whichever of the first or fourth working volumes is expanding as the first and second pistons move within their respective chambers, and for establishing fluid communication between the pressurized line to the filtering unit and whichever of the first or fourth working volumes is contracting, whereby fluid made available through the feed line flows into whichever of the first or fourth working volumes is expanding and is thereafter pumped through the pressurized output line when that working volume is subsequently contracting; and second valving means including energy recovery valves and discharge valves for establishing fluid communication between the energy recovery line and the second working volume, and between the discharge line and the third working volume, whenever the first piston rod is at its BDC position; and for establishing fluid communication between the energy recovery line and the third working volume, and between the discharge line and the second working volume, whenever the first piston rod is at is TDC position;

whereby the pressure of the concentrate stream in the energy recovery line in whichever of the second or third working volumes is about to expand assists in driving the first and second pistons during the pumping stroke thereof, while the discharge line is alternately in fluid communication with whichever of the second or third working volumes is about to contract so that fluid present therein will be discharged therethrough, the diameter of the common piston rod being sized so that the maximum value of the second working volume is less than the maximum value of the first working volume by a factor R which is equal to the ratio between the volume of flow to the filtering unit and the desired volume of flow of the concentrate stream;

a controlled reciprocating power means mechanically linked to said drive piston;

a control unit including means for creating a dwell period during which the first and second pistons are stopped at the end of each forward and rearward piston stroke and means for controlling the movement during each piston stroke to create an acceleration period, a constant velocity period, and a deceleration period; and the control unit also including means for selectively opening and closing the energy-recovery valves and the discharge valves of the second valving means only during one of the dwell periods so that wear thereupon is significantly reduced; and said combination including means which controls the three controlled reciprocating power means so that the timing of movement of said drive piston rods is such that a phase differential of 120° is produced between the movements of the pistons in the respective cylinders in each of the three pumps.

* * * * *

UNITED STATES PATENT AND TRADEMARK OFFICE
CERTIFICATE OF CORRECTION

PATENT NO. : 6,017,200

DATED : January 25, 2000

INVENTOR(S) : Willard D. Childs, et al.

It is certified that error appears in the above-identified patent and that said Letters Patent is hereby corrected as shown below:

Column 1, below the title, insert paragraph --This invention was made with Government support under Assistance Agreement No. 1425-5-FC-81-20410, awarded by the Bureau of Reclamation. The Government has certain rights in this invention.--

Signed and Sealed this

Twenty-seventh Day of June, 2000

Attest:

Q. TODD DICKINSON

*Attesting Officer*  *Director of Patents and Trademarks*

UNITED STATES PATENT AND TRADEMARK OFFICE
CERTIFICATE OF CORRECTION

PATENT NO. : 6,017,200
DATED : January 25, 2000
INVENTOR(S) : Childs et al.

It is certified that error appears in the above-identified patent and that said Letters Patent is hereby corrected as shown below:

IN THE CLAIMS:

Column 20, line 2 (claim 6), change "9" to --5--.
Column 20, line 30 (claim 7), change "12" to --30--.
Column 20, line 46 (claim 9), change "12" to --30--.
Column 20, line 51 (claim 10), change "12" to --30--.
Column 23, line 3 (claim 16), change "(L$\lceil$/4)" to --(Lп/4)--.
Column 26, line 22 (claim 28), change "22" to --27--.

Add claim 30 as follows: 30. A positive displacement, energy recovery, fluid pump driven by a controlled power source that provides a reciprocating mechanical force, wherein an input fluid is pumped through an operational device at a high pressure, and wherein an output fluid exits the device under pressure, comprising: a first piston mounted for reciprocating movement within a first sealed cylinder, said first piston separating said first cylinder into first and second working volumes, the first working volume comprising the volume within said first cylinder bounded by a forward side of the first piston, and the second working volume comprising the volume within said first cylinder bounded by a back side of the first piston, whereby as the first piston reciprocates within the first cylinder the first working volume increases in volume as the second working volume decreases in volume, and the first

UNITED STATES PATENT AND TRADEMARK OFFICE
CERTIFICATE OF CORRECTION

PATENT NO. : 6,017,200
DATED : January 25, 2000
INVENTOR(S) : Childs et al

It is certified that error appears in the above-identified patent and that said Letters Patent is hereby corrected as shown below:

working volume decreases in volume as the second working increases in volume;

a second piston mounted for reciprocating movement within a second sealed cylinder, said second piston separating said second cylinder into first and second working volumes, the first working volume of the second cylinder comprising the volume within said second cylinder bounded by a forward side of the second piston, and the second working volume within the second cylinder comprising the volume within said second cylinder bounded by the back side of the second piston, whereby as the second piston reciprocates within the second cylinder, the first working volume increases in volume as the second working volume decreases in volume, and the first working volume decreases in volume as the second working volume increases in volume;

UNITED STATES PATENT AND TRADEMARK OFFICE
CERTIFICATE OF CORRECTION

PATENT NO. : 6,017,200  
DATED : January 25, 2000  
INVENTOR(S) : Childs, et al

Page 3 of 6

It is certified that error appears in the above-identified patent and that said Letters Patent is hereby corrected as shown below:

linkage means for mechanically linking the controlled power source to the first and second pistons so that both are reciprocated by the power source at the same time, wherein the first working volume of the first and second cylinders increase in volume at the same time that the second working volume in the first and second cylinders decrease in volume, and the first working volume in the first and second cylinders decrease in volume at the same time that the second working volume in the first and second cylinders increase in volume;

said controlled power means including means for creating a dwell period during which each piston is stopped at the end of each forward and backward stroke;

input valving means for establishing a fluid communication between a source of input fluid and whichever of the first working volume within the first cylinder or second

UNITED STATES PATENT AND TRADEMARK OFFICE
CERTIFICATE OF CORRECTION

PATENT NO. : 6,017,200  
DATED : January 25, 2000  
INVENTOR(S) : Childs et al.

It is certified that error appears in the above-identified patent and that said Letters Patent is hereby corrected as shown below:

working volume within the second cylinder is increasing in volume, whereby such increasing-in-volume working volume acts as a collection reservoir for receiving the input fluid;
    output valving means for establishing a fluid communication between the device, and an output port on whichever of said first working volume within the first cylinder or said second working volume within the second cylinder is decreasing in volume, whereby the fluid within such decreasing-in-volume working volume is forced out of the decreasing-in-volume working volume under pressure, causing it to flow to the device, thereby pumping the fluid to the device under pressure;

UNITED STATES PATENT AND TRADEMARK OFFICE
CERTIFICATE OF CORRECTION

PATENT NO. : 6,017,200
DATED : January 25, 2000
INVENTOR(S) : Childs et al

Page 5 of 6

It is certified that error appears in the above-identified patent and that said Letters Patent is hereby corrected as shown below:

energy recovery valving means for establishing a fluid communication between the pressurized first output fluid which exits from said device and whichever of the second-working volume of the first cylinder or the first working volume of the second cylinder is increasing in volume, whereby a pressure force associated with the output fluid assists in moving the first and second pistons to increase the volume of the increasing-in-volume working volume, which pressure force thereby adds to the reciprocating force provided by the power source, thereby improving the efficiency of the pump;

discharge valving means for establishing a fluid communication between a discharge port and whichever of the second working volume within the first cylinder or the first working volume within the second cylinder is decreasing, whereby the output fluid contained within the second working volume within the first cylinder and first working volume within the second cylinder is alternately discharged therefrom through the discharge port as the respective working volume decreases, and

UNITED STATES PATENT AND TRADEMARK OFFICE
CERTIFICATE OF CORRECTION

PATENT NO. : 6,017,200
DATED : January 25, 2000
INVENTOR(S) : Childs, et al

It is certified that error appears in the above-identified patent and that said Letters Patent is hereby corrected as shown below:

a control unit for selectively opening and closing the energy recovery valving means and the discharge valving means only during the dwell periods,
              whereby wear on such valving means is significantly reduced.

Signed and Sealed this

Seventh Day of November, 2000

Attest:

Q. TODD DICKINSON

*Attesting Officer*      *Director of Patents and Trademarks*